US012578030B2

(12) United States Patent
Tanaka et al.

(10) Patent No.: US 12,578,030 B2
(45) Date of Patent: Mar. 17, 2026

(54) VALVE DEVICE

(71) Applicant: DENSO CORPORATION, Kariya-city (JP)

(72) Inventors: Atsushi Tanaka, Kariya-city (JP); Yasuo Kato, Kariya-city (JP); Ryo Sano, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 0 days.

(21) Appl. No.: 18/658,010

(22) Filed: May 8, 2024

(65) Prior Publication Data

US 2024/0288086 A1 Aug. 29, 2024

Related U.S. Application Data

(63) Continuation of application No. PCT/JP2023/005761, filed on Feb. 17, 2023.

(30) Foreign Application Priority Data

Mar. 3, 2022 (JP) ................................. 2022-032929

(51) Int. Cl.
*F16K 27/04* (2006.01)
*F16K 3/08* (2006.01)
(Continued)

(52) U.S. Cl.
CPC ................ *F16K 27/04* (2013.01); *F16K 3/08* (2013.01); *B29C 2045/0027* (2013.01);
(Continued)

(58) Field of Classification Search
CPC . F16K 3/08; F16K 3/085; F16K 27/04; F16K 27/00; F16K 31/02–055;
(Continued)

(56) References Cited

U.S. PATENT DOCUMENTS 3,368,583 A * 2/1968 Weaver ................. F16K 31/143
137/625.46
5,950,576 A * 9/1999 Busato ..................... F01P 7/16
137/625.46
(Continued)

FOREIGN PATENT DOCUMENTS

JP 2002257248 A 9/2002
JP 2009-27908 2/2009
(Continued)

OTHER PUBLICATIONS

U.S. Appl. No. 18/650,980 to Yoshitada Aono, filed Apr. 30, 2024 (55 pages).

*Primary Examiner* — Craig J Price
(74) *Attorney, Agent, or Firm* — Nixon & Vanderhye P.C.

(57) ABSTRACT

A boss is shaped in a tubular form and is injection molded integrally with a housing that forms a flow passage. A ring member is press-fitted to an inner peripheral wall of the boss. A shaft placed on a radially inner side of the ring member is configured to be rotated about a central axis. A movable valve is coupled to a portion of the shaft and is configured to adjust a size of a cross-sectional area of a passage opening at the flow passage. Each of gate marks of the housing is a trace of a site of the housing where molten resin is injected at a time of injection molding of the housing. Each of ribs radially inwardly projects from the inner peripheral wall of the boss and is placed at a corresponding location of the boss which is between adjacent two of the gate marks.

11 Claims, 14 Drawing Sheets

(51) Int. Cl.

| | |
|---|---|
| *B29C 45/00* | (2006.01) |
| *F16K 11/074* | (2006.01) |
| *F16K 31/04* | (2006.01) |
| *F16K 31/53* | (2006.01) |

(52) U.S. Cl.
CPC .......... *F16K 11/0743* (2013.01); *F16K 31/04* (2013.01); *F16K 31/535* (2013.01); *Y10T 137/86863* (2015.04)

(58) Field of Classification Search
CPC .......... F16K 11/072–076; F16K 7/003; F16K 7/044; F16K 7/045; F16K 3/04–10; F16K 3/34; F16K 31/535; F16K 31/54; F16K 11/0743; F16K 11/074; F01P 7/16; F01P 2007/146; F25B 41/42; Y10T 137/86863; B29C 2045/0027
USPC .......... 137/625.46, 625.41, 625.11, 625.15; 251/59, 711, 29.11, 129.12, 160–166, 251/180–184, 192–204, 207–209, 283, 251/292, 304–317.1, 345, 352; 123/41.08
See application file for complete search history.

(56) References Cited

U.S. PATENT DOCUMENTS

| | | | | |
|---|---|---|---|---|
| 6,082,703 | A * | 7/2000 | Fava .......................... | F16K 3/08 251/30.02 |
| 6,196,266 | B1 * | 3/2001 | Breda ................. | F16K 11/0853 137/454.6 |
| 6,626,421 | B2 * | 9/2003 | Torii ....................... | F02D 9/108 251/305 |
| 7,168,682 | B2 * | 1/2007 | Nanba .................. | F02D 9/1045 251/305 |
| 7,722,351 | B2 * | 5/2010 | Feick .................... | B29C 45/281 264/328.9 |
| 9,057,449 | B2 * | 6/2015 | Iwata .................... | F16K 27/003 |
| 9,638,340 | B2 * | 5/2017 | Bachofer ............. | F16K 11/0743 |
| 9,746,087 | B2 * | 8/2017 | Yokoe ................. | F16K 31/535 |
| 9,803,759 | B2 * | 10/2017 | Bachofer ............. | F16K 11/0743 |
| 10,025,243 | B2 * | 7/2018 | Tamura ............... | B29C 45/0025 |
| 10,808,856 | B2 * | 10/2020 | Shen .......................... | F01P 3/20 |
| 10,975,975 | B2 * | 4/2021 | Sato .......................... | F01P 7/14 |
| 11,092,086 | B2 * | 8/2021 | Miwa ....................... | H02K 5/10 |
| 11,092,087 | B2 * | 8/2021 | Fujinaka .................. | F16K 1/22 |
| 11,098,807 | B2 * | 8/2021 | Suzuki ................. | F16K 11/076 |
| 11,221,077 | B2 * | 1/2022 | Park ...................... | F16K 17/048 |
| 11,293,557 | B2 * | 4/2022 | Warashina ............ | F16K 39/022 |
| 11,572,957 | B2 * | 2/2023 | Chapman ............ | F16K 11/0743 |
| 11,585,451 | B2 * | 2/2023 | Chapman ............ | F16K 11/0743 |
| 11,867,299 | B2 * | 1/2024 | Kanki ...................... | F01P 3/02 |
| 11,867,309 | B2 * | 1/2024 | Uno ........................ | F02M 26/72 |
| 11,873,753 | B2 * | 1/2024 | Higuchi ................. | B60K 11/02 |
| 12,117,089 | B2 * | 10/2024 | Hamada ............... | F16K 3/0254 |
| 12,135,095 | B2 * | 11/2024 | Sano ..................... | F16K 11/074 |
| 12,270,490 | B2 * | 4/2025 | Bachofer ............. | F16K 11/074 |
| 12,338,906 | B2 * | 6/2025 | Tanaka .................. | F16K 31/04 |
| 12,359,731 | B2 * | 7/2025 | Hamada ................. | F16K 31/04 |
| 12,359,740 | B2 * | 7/2025 | Kimura .................. | F16K 31/04 |
| 2003/0131678 | A1 * | 7/2003 | Noguchi ................. | F16H 55/06 428/35.7 |
| 2006/0000997 | A1 * | 1/2006 | Shimada ................. | F02D 9/107 251/308 |
| 2006/0144450 | A1 * | 7/2006 | Hasegawa ......... | H01M 8/04089 137/625.46 |
| 2006/0260703 | A1 * | 11/2006 | Johnson ............ | A61M 16/0468 137/854 |
| 2016/0022977 | A1 * | 1/2016 | Ueda ................... | A61M 39/105 264/155 |
| 2019/0301619 | A1 * | 10/2019 | Wu ......................... | F16K 3/314 |
| 2019/0309862 | A1 * | 10/2019 | Yu ......................... | F16K 27/048 |
| 2023/0228335 | A1 | 7/2023 | Sano | |
| 2024/0003440 | A1 * | 1/2024 | Sano .................... | F16K 31/041 |
| 2024/0183456 | A1 * | 6/2024 | Bachofer ........... | F16K 11/0743 |
| 2024/0288086 | A1 * | 8/2024 | Tanaka ................... | F16K 27/04 |
| 2025/0129860 | A1 * | 4/2025 | Ouchi .................... | F16K 3/08 |
| 2025/0155032 | A1 * | 5/2025 | Vincon .................. | F16K 3/10 |
| 2025/0164019 | A1 * | 5/2025 | Nomura ............. | F16K 11/0856 |

FOREIGN PATENT DOCUMENTS

| | | |
|---|---|---|
| JP | 2009-228765 | 10/2009 |
| JP | 2011-179479 | 9/2011 |

* cited by examiner

VALVE DEVICE

CROSS REFERENCE TO RELATED APPLICATIONS

This application is a continuation application of International Patent Application No. PCT/JP2023/005761 filed on Feb. 17, 2023, which designated the U.S. and claims the benefit of priority from Japanese Patent Application No. 2022-032929 filed on Mar. 3, 2022. The entire disclosures of all of the above applications are incorporated herein by reference.

TECHNICAL FIELD

The present disclosure relates to a valve device.

BACKGROUND

A previously proposed valve device is configured to control a flow rate of a fluid conducted through a coolant circuit installed in an electric vehicle. This valve device includes: a housing that forms a flow passage; a shaft that is configured to be rotated about a central axis in the flow passage; a movable valve which is shaped in a circular disk form and is installed to an end portion of the shaft; and a torsion spring that is placed around the shaft. The torsion spring applies a spring force to the shaft in a circumferential direction, thereby reducing circumferential positional variation of the shaft and the movable valve. In the previously proposed valve device, one end portion of the shaft is rotatably supported by a bearing, and the other end portion of the shaft is rotatably supported by a hole formed at the housing. The bearing is held at an inside of a tubular portion of the housing (referred to as a boss).

SUMMARY

This section provides a general summary of the disclosure, and is not a comprehensive disclosure of its full scope or all of its features.

According to the present disclosure, there is provided a valve device that includes a housing, a boss, a ring member, a shaft and a movable valve. The housing is made of resin and forms a flow passage which is configured to conduct a fluid. The boss is shaped in a tubular form and is injection molded integrally with the housing. The ring member is press-fitted to and is held by an inner peripheral wall of the boss. The shaft is placed on a radially inner side of the ring member and is configured to be rotated about a central axis of the boss. The shaft extends in an axial direction of the central axis in the flow passage. The movable valve is coupled to a portion of the shaft and is configured to be rotated about the central axis in response to rotation of the shaft. The movable valve is configured to adjust a size of a cross-sectional area of a passage opening formed at a portion of the flow passage. The boss has at least one rib that radially inwardly projects from the inner peripheral wall of the boss.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
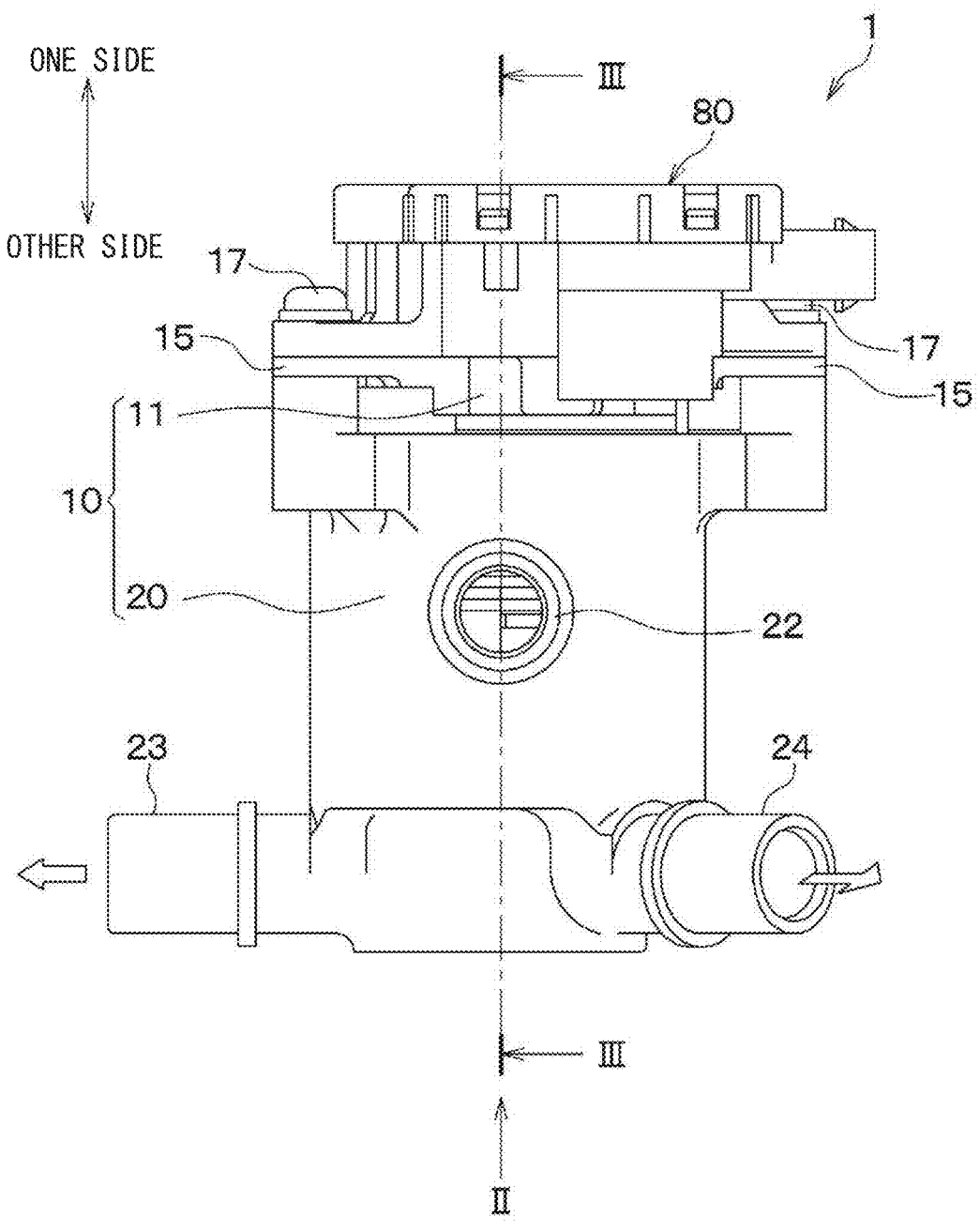
FIG. 1 is a front view of a valve device according to a first embodiment.

Conventionally, a valve device for controlling a flow rate of a fluid conducted through a coolant circuit installed in an electric vehicle is known. In order to limit the electric power consumption at the electric vehicle, it is effective to limit excess heat emissions at the coolant circuit. Therefore, it is important to achieve precise control of the amount of heat emission through precise flow rate control of a water-based coolant at the coolant circuit by means of a valve device.

A previously proposed valve device includes: a housing that forms a flow passage; a shaft that is configured to be rotated about a central axis in the flow passage; a movable valve which is shaped in a circular disk form and is installed to an end portion of the shaft; and a torsion spring that is placed around the shaft. The torsion spring applies a spring force to the shaft in a circumferential direction, thereby reducing circumferential positional variation of the shaft and the movable valve.

In the previously proposed valve device, one end portion of the shaft is rotatably supported by a bearing, and the other end portion of the shaft is rotatably supported by a hole formed at the housing. The bearing is held at an inside of a tubular portion of the housing (hereinafter referred to as a boss). This limits variations in the radial position of the bearing and the shaft. In this valve device, the shaft and the movable valve are coupled together, and the shaft is inserted through a stationary disk. Thus, a variation in a size of a cross-sectional area of an opening of the flow passage can be limited, and thereby highly accurate flow rate control is made possible.

In recent years, there has been a demand to form the housing with resin for the purpose of reducing the weight and costs of the valve device. In such a case, there is concern that the boss may crack when the bearing is press-fitted to the boss formed at the portion of the housing. Particularly, if a weld, which causes a reduction in the strength of the boss, is formed at a portion of the boss at the time of injection molding of the housing, the weld may promote cracking of the housing at the time of press-fitting the bearing to the boss. When the crack is generated at the boss of the housing to cause the variation in the radial position of the shaft, the accuracy of the flow rate control by the movable valve coupled to the shaft may possibly be deteriorated.

According to one aspect of the present disclosure, a valve device includes a housing, a boss, a ring member, a shaft, a movable valve, a plurality of gate marks and a plurality of ribs. The housing is made of resin and forms a flow passage which is configured to conduct a fluid. The boss is shaped in a tubular form and is injection molded integrally with the housing. The ring member is press-fitted to and is held by an inner peripheral wall of the boss. The shaft is placed on a radially inner side of the ring member and is configured to be rotated about a central axis of the boss. The shaft extends in an axial direction of the central axis in the flow passage. The movable valve is coupled to a portion of the shaft and is configured to be rotated about the central axis in response to rotation of the shaft. The movable valve is configured to adjust a size of a cross-sectional area of a passage opening formed at a portion of the flow passage. Each of the plurality of gate marks is a trace of a site of the housing where molten resin is injected at a time of injection molding of the housing. Each of the plurality of gate marks is formed at a corresponding location of the housing which is offset from the central axis of the boss. Each of the plurality of ribs radially inwardly projects from the inner peripheral wall of the boss. Each of the plurality of ribs is placed at a corresponding location of the boss which is between corresponding circumferentially adjacent two of the plurality of gate marks. The boss has a plurality of reinforced portions, at each of which a corresponding one of the plurality of ribs is placed, and a plurality of unreinforced portions, at each of which none of the plurality of ribs is placed.

According to the above configuration, in the case where each of the plurality of gate marks is formed at the corresponding location of the housing which is offset from the central axis of the boss, a weld is formed at the boss. By placing the rib at the location (hereinafter referred to as a weld portion) where the weld is generated, a press-fit strength of the boss at the time of press-fitting the ring member to the inner peripheral wall of the boss can be improved.

Furthermore, since the rib strengthens only the weld portion, which has a low resin strength at the boss, the boss has the reinforced portion and the unreinforced portion. Deformation of the boss at the time of press-fitting the ring member to the boss is made such that the amount of deformation of the unreinforced portion, which has the high resin strength at the boss, is increased by the amount that corresponds to the amount of reduction in the amount of deformation of the reinforced portion, which has the low resin strength at the boss. Therefore, it is possible to adjust the strength balance when the resin strength in view of the presence of the weld at the boss and the shape strength in view of the presence of the rib at the boss are considered together, thereby overcoming the weak point of the weld strength. Therefore, generation of a crack of the boss is limited to achieve the press-fitting and the holding of the ring member by the boss, thereby reducing the variation in the radial position of the shaft. As a result, the size of the cross-sectional area of the passage opening can be controlled with high precision by the movable valve coupled to the shaft, thereby improving the accuracy of flow rate control.

According to another aspect of the present disclosure, a valve device includes a housing, a boss, a ring member, a shaft, a movable valve, a single gate mark and a rib. The housing is made of resin and forms a flow passage which is configured to conduct a fluid. The boss is shaped in a tubular form and is injection molded integrally with the housing. The ring member is press-fitted to and is held by an inner peripheral wall of the boss. The shaft is placed on a radially inner side of the ring member and is configured to be rotated about a central axis of the boss. The shaft extends in an axial direction of the central axis in the flow passage. The movable valve is coupled to a portion of the shaft and is configured to be rotated about the central axis in response to rotation of the shaft. The movable valve is configured to adjust a size of a cross-sectional area of a passage opening formed at a portion of the flow passage. The single gate mark is a trace of a site of the housing where molten resin is injected at a time of injection molding of the housing. The single gate mark is formed at a corresponding location of the housing which is offset from the central axis of the boss. The rib radially inwardly projects from the inner peripheral wall of the boss. The rib is placed at a corresponding location of the boss which is opposed to the single gate mark about the central axis. The boss has a reinforced portion, at which the rib is placed, and an unreinforced portion, at which the rib is not placed.

With the above configuration, the other aspect described above can provide advantages which are similar to those of the one aspect discussed above.

According to a further aspect of the present disclosure, a valve device includes a housing, a boss, a ring member, a shaft, a movable valve and a rib. The housing is made of resin and forms a flow passage which is configured to conduct a fluid. The boss is shaped in a tubular form and is injection molded integrally with the housing. The ring member is press-fitted to and is held by an inner peripheral wall of the boss. The shaft is placed on a radially inner side of the ring member and is configured to be rotated about a central axis of the boss. The shaft extends in an axial direction of the central axis in the flow passage. The movable valve is coupled to a portion of the shaft and is configured to be rotated about the central axis in response to rotation of the shaft. The movable valve is configured to adjust a size of a cross-sectional area of a passage opening formed at a portion of the flow passage. The rib radially inwardly projects from the inner peripheral wall of the boss. The rib is placed at a corresponding location of the boss that includes a weld, which is a trace of a site where flows of the molten resin meet each other at the time of injection molding of the housing. The boss has a reinforced portion, at which the rib is placed, and an unreinforced portion, at which the rib is not placed.

With the above configuration, the further aspect can provide advantages which are similar to those of the one aspect discussed above.

Hereinafter, embodiments of the present disclosure will be described with reference to the drawings. In each of the following embodiments, portions, which are the same or equivalent to each other, will be indicated by the same reference signs.

First Embodiment

The first embodiment will be described with reference to the drawings. A valve device 1 of the present embodiment is installed in, for example, a fluid circulation circuit that executes cabin air conditioning and battery temperature adjustment in an electric vehicle. In the fluid circulation circuit of the electric vehicle, it is required to finely adjust the temperature according to each of the cabin air conditioning and the battery temperature adjustment. Therefore, the valve device 1 used in the fluid circulation circuit of the electric vehicle is required to highly precisely control a flow rate of a water-based coolant in comparison to a valve device used in a coolant circuit of an internal combustion engine. Therefore, the valve device 1 is capable of highly precisely controlling the flow rate of the fluid to be supplied to each corresponding flow passage in the fluid circulation circuit in addition to allowing, blocking and switching a flow of the fluid in the flow passage in which the valve device 1 is installed in the fluid circulation circuit. For example, LLC, which contains ethylene glycol, is used as the fluid. Here, LLC stands for Long Life Coolant.

Figure 2:
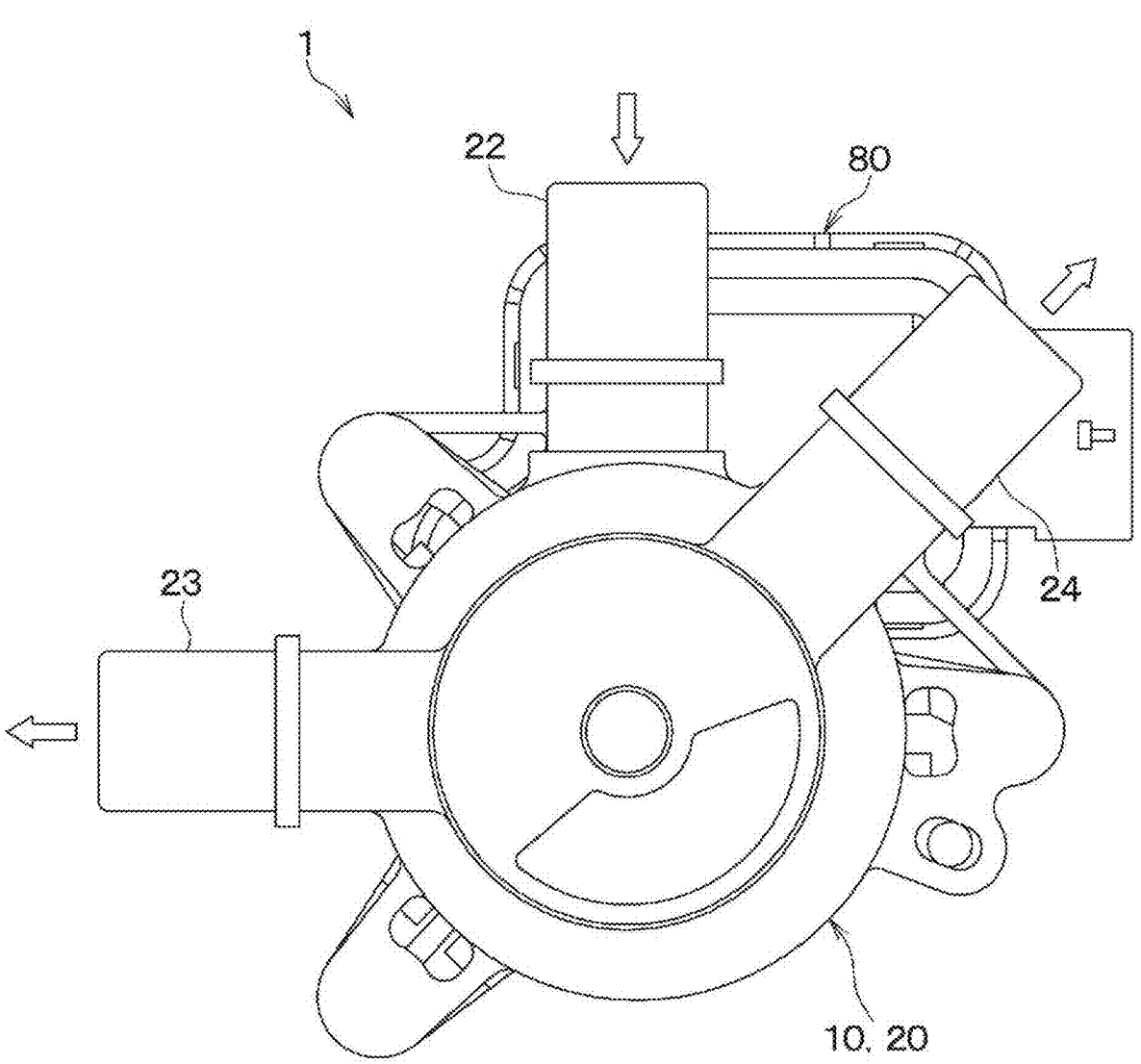
FIG. 2 is a bottom view of the valve device seen in a direction of an arrow II in FIG. 1.
Figure 3:
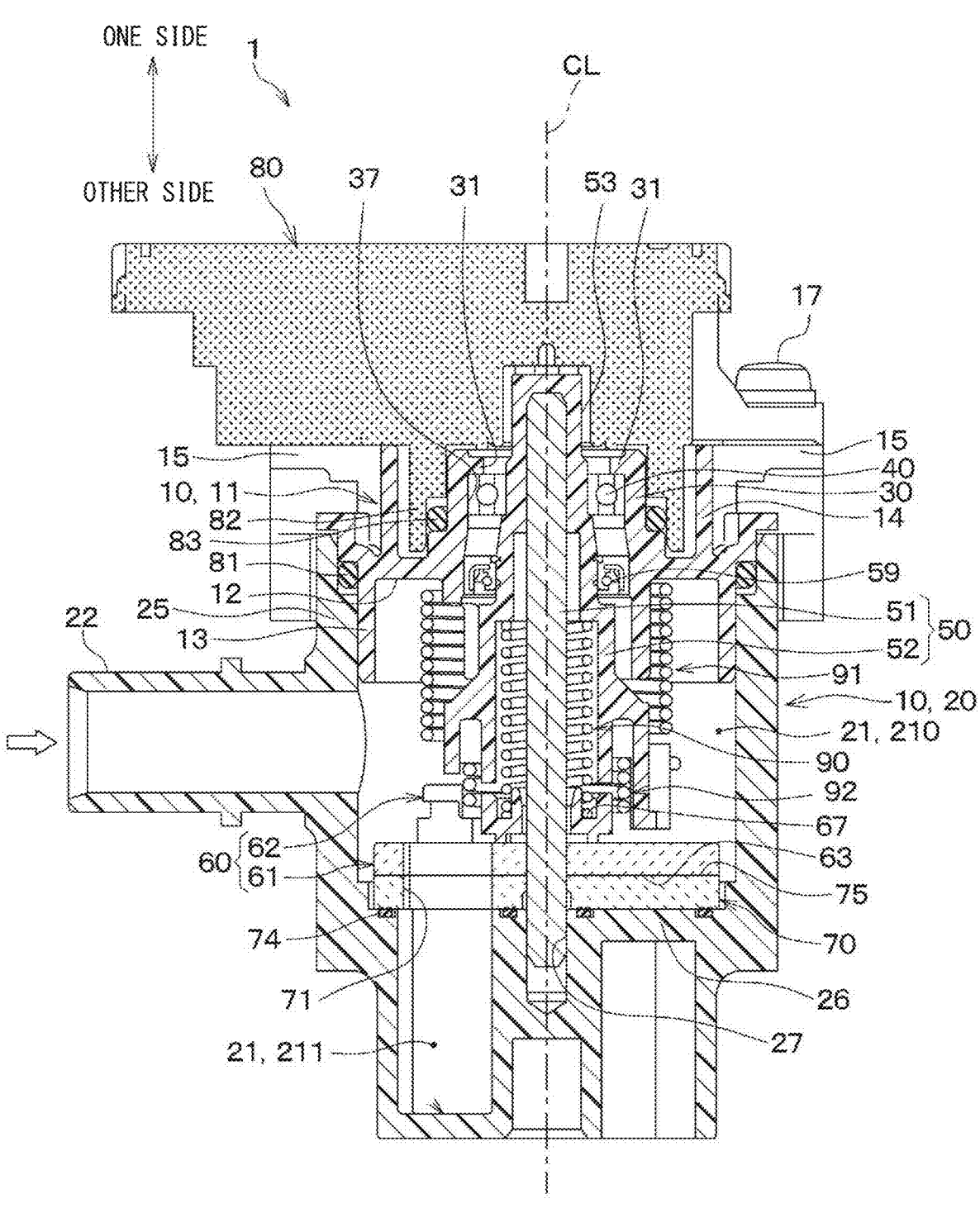
FIG. 3 is a cross-sectional view taken along line III-III in FIG. 1.

As shown in FIGS. 1 to 3, the valve device 1 includes a housing 10, a boss 30, a bearing (serving as a ring member) 40, a shaft 50, a movable valve 60, a stationary disk 70 and a drive device 80. The housing 10 includes a first housing 11 and a second housing 20.

In the following description, a radial direction of an imaginary circle, which is perpendicular to a central axis CL of the boss 30 and the shaft 50 and is centered on the central axis CL, will be simply referred to as a radial direction, and a circumferential direction of the imaginary circle will be simply referred to as a circumferential direction. Furthermore, an axial direction of the central axis CL of the boss 30 and the shaft 50 will be referred to as an axial direction. Furthermore, for the purpose of description, an upper side of a plane of FIG. 1 will be referred to as one side in the axial direction, and a lower side of the plane of FIG. 1 will be referred to as the other side in the axial direction.

As shown in FIG. 3, the first housing 11 and the second housing 20 form a flow passage 21, which is configured to conduct the fluid, at an inside of the first housing 11 and the second housing 20. As shown in FIGS. 1 and 2, the second housing 20 has: an inlet 22, through which the fluid is supplied into the flow passage 21 located at the inside of the second housing 20; and a first outlet 23 and a second outlet 24, through which the fluid is outputted from the flow passage 21 located at the inside of the second housing 20.

Figure 6:
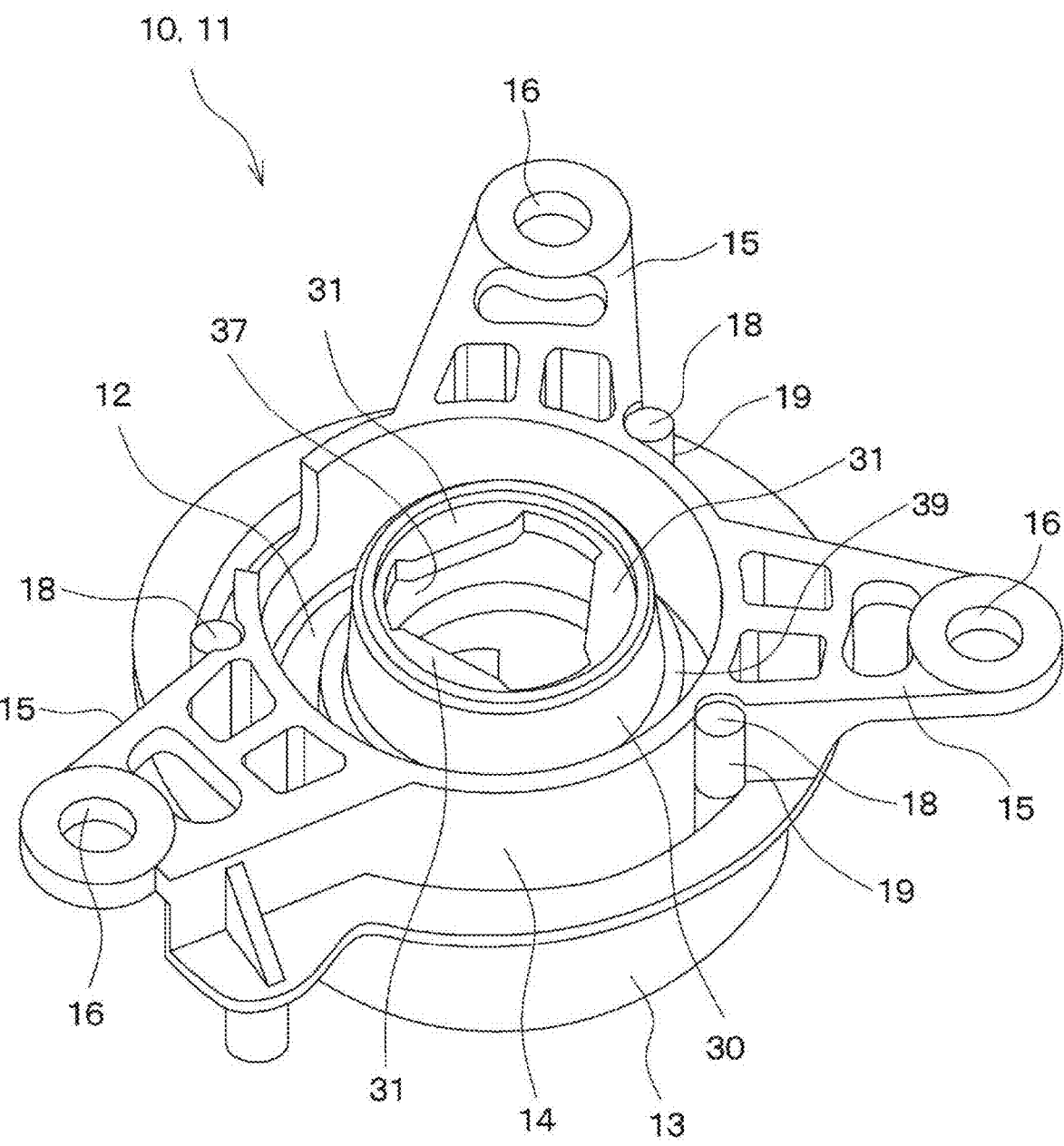
FIG. 6 is a perspective view of a first housing of the valve device.
Figure 7:
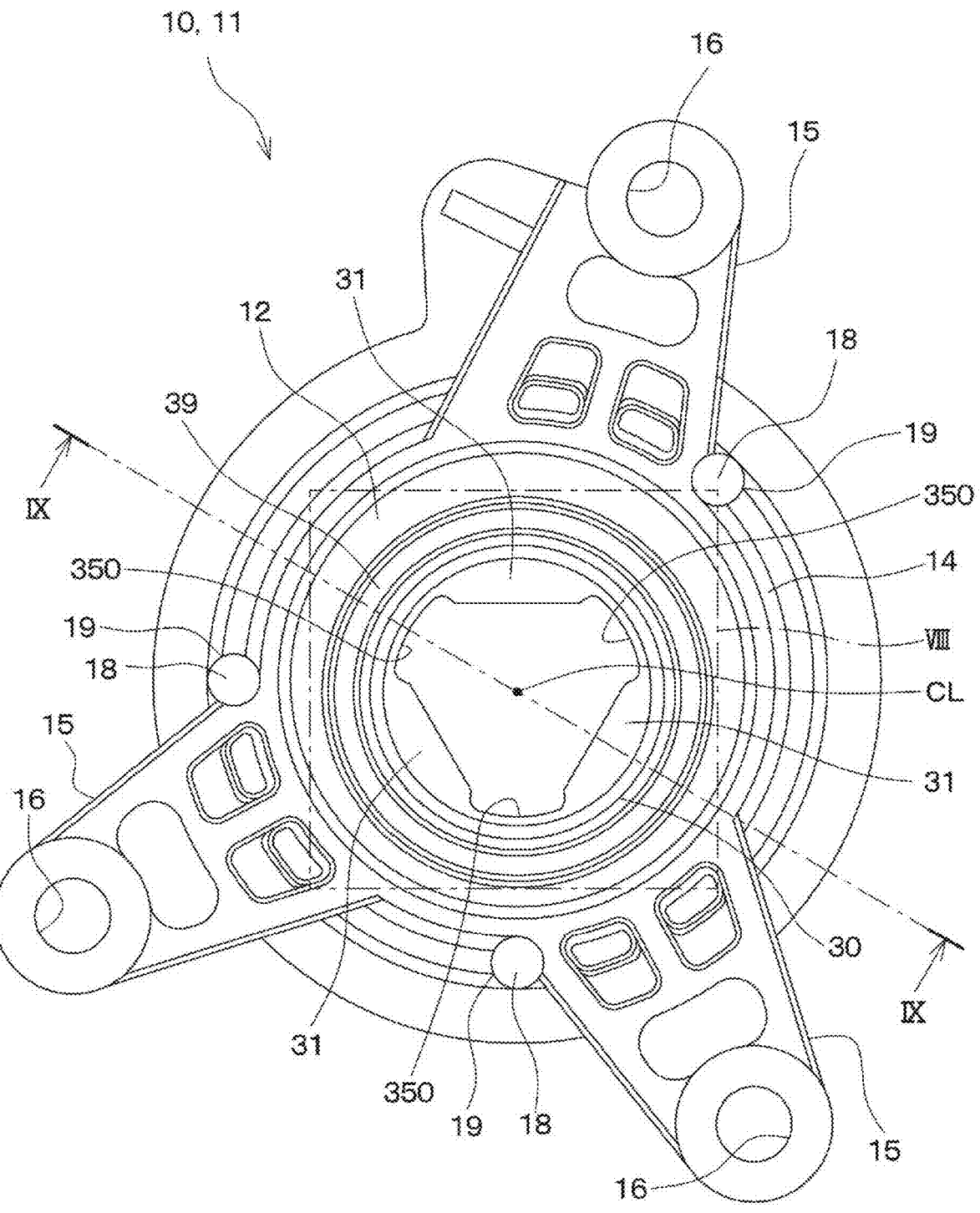
FIG. 7 is a plan view of the first housing of the valve device.

The first housing 11 covers an inner opening of a tubular portion 25 of the second housing 20 placed on the one side in the axial direction. As shown in FIGS. 3, 6 and 7, the first housing 11 has a plate portion 12, a fitting tubular portion 13, the boss 30, a plurality of ribs 31, an intermediate tubular portion 14 and a plurality of fastening portions 15.

The plate portion 12 of the first housing 11 is shaped in a circular ring form. The fitting tubular portion 13 is shaped in a tubular form and extends from a radially outer part of the plate portion 12 toward the other side in the axial direction. The tubular portion 25 of the second housing 20 is fitted to an outer peripheral surface of the fitting tubular portion 13. An O-ring 81 is installed between the tubular portion 25 of the second housing 20 and the fitting tubular portion 13 of the first housing 11.

The boss 30 is shaped in a tubular form and extends from a radially inner part of the plate portion 12 toward the one side in the axial direction. The ribs 31 are placed at one end portion of the boss 30 in the axial direction and radially inwardly project from an inner peripheral wall 37 of the boss 30.

The bearing 40 is press-fitted to and is held by an inner peripheral surface of the boss 30. A ball bearing is used as the bearing 40. The shaft 50 is supported at the inside of the bearing 40 such that the shaft 50 is rotatable about the central axis CL. The central axis CL of the boss 30 and the central axis CL of the shaft 50 coincide with each other.

A shaft seal 59 is installed between the inner peripheral surface of the boss 30 and the shaft 50. A drive-side tubular portion 82, which is shaped in a tubular form and extends from the drive device 80, is fitted to an outer periphery of the boss 30. An O-ring 83 is installed between the drive-side tubular portion 82 and the boss 30.

Furthermore, the intermediate tubular portion 14 is shaped in a tubular form and extends toward the one side in the axial direction from a surface of the plate portion 12 which faces the drive device 80. The fastening portions 15 radially outwardly extend from an end portion of the intermediate tubular portion 14 which faces the one side in the axial direction. A bolt 17 is inserted through a through-hole 16 of each of the fastening portions 15 to couple between the first housing 11 and the drive device 80. Details of the structure of the first housing 11 will be described later.

As shown in FIG. 3, the stationary disk 70, the shaft 50, the movable valve 60, a compression spring 90, a first torsion spring 91 and a second torsion spring 92 are received at the inside of the second housing 20.

Figure 4:
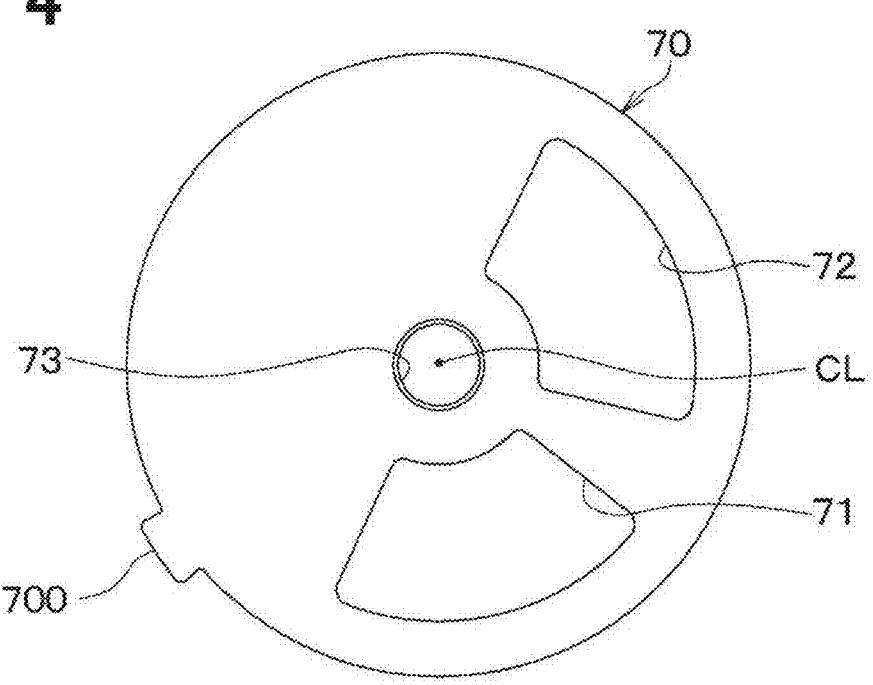
FIG. 4 is a plan view of a stationary disk of the valve device.

The stationary disk 70 is fixed to a mounting portion 26 formed at an inner wall of the second housing 20. As shown in FIGS. 3 and 4, the stationary disk 70 is shaped in a circular disk form and is made of, for example, ceramic. A projection 700 is formed at an outer periphery of the stationary disk 70. The projection 700 is fitted into a groove (not shown) of the second housing 20 to limit rotation of the stationary disk 70 relative to the second housing 20 about the central axis CL. The stationary disk 70 partitions the flow passage 21, which is located at the inside of the second housing 20, into an inlet 22 side space, a first outlet 23 side space and a second outlet 24 side space. In the following description, at the inside of the second housing 20, the inlet 22 side space of the flow passage 21 will be referred to as an inlet-side space 210, and the first outlet 23 side space of the flow passage 21 will be referred to as a first outlet-side space 211, and the second outlet 24 side space of the flow passage 21 will be referred to as a second outlet-side space. In FIG. 3, the second outlet-side space is not indicated.

As shown in FIG. 4, the stationary disk 70 has a plurality of passage openings 71, 72 which penetrate through the stationary disk 70 in a plate thickness direction thereof. A first passage opening 71 among the passage openings 71, 72 communicates between the inlet-side space 210 and the first outlet-side space 211. A second passage opening 72 communicates between the inlet-side space 210 and the second outlet-side space. A through-hole 73, through which a rod 51 of the shaft 50 is inserted, is formed at a center of the stationary disk 70. As shown in FIG. 3, a gasket 74, which is installed at the stationary disk 70, is fitted into a groove formed at the inner wall of the second housing 20 to block a flow of the fluid, which flows among the inlet-side space 210, the first outlet-side space 211 and the second outlet-side space while bypassing the outer periphery of the stationary disk 70.

As shown in FIG. 3, the shaft 50 includes the rod 51 made of metal and a holder 52 made of resin, and the rod 51 and the holder 52 are integrally formed together by insert-molding. Therefore, the shaft 50 has a high degree of straightness of its own. The shaft 50 extends in the axial direction in the flow passage 21 and is configured to be rotated about the central axis CL. Specifically, one end portion of the shaft 50 is rotatably supported by the bearing 40 that is press-fitted to the boss 30. The other end portion of the shaft 50 is rotatably supported by a plain bearing hole 27 formed at the second housing 20. As described above, the two end portions of the shaft 50 are supported, and thereby positional deviation of the central axis CL of the shaft 50 is limited.

A gear 53 is formed at the end portion of the shaft 50 which is placed adjacent to the drive device 80. The gear 53 is meshed with an output gear (not shown) of the drive device 80. The drive device 80 includes, for example, an electric motor (not shown) and a speed reducer mechanism (not shown). For example, a stepping motor is used as the electric motor. The drive device 80 is configured to rotate the shaft 50 about the central axis CL in a forward direction and a reverse direction.

Figure 5:
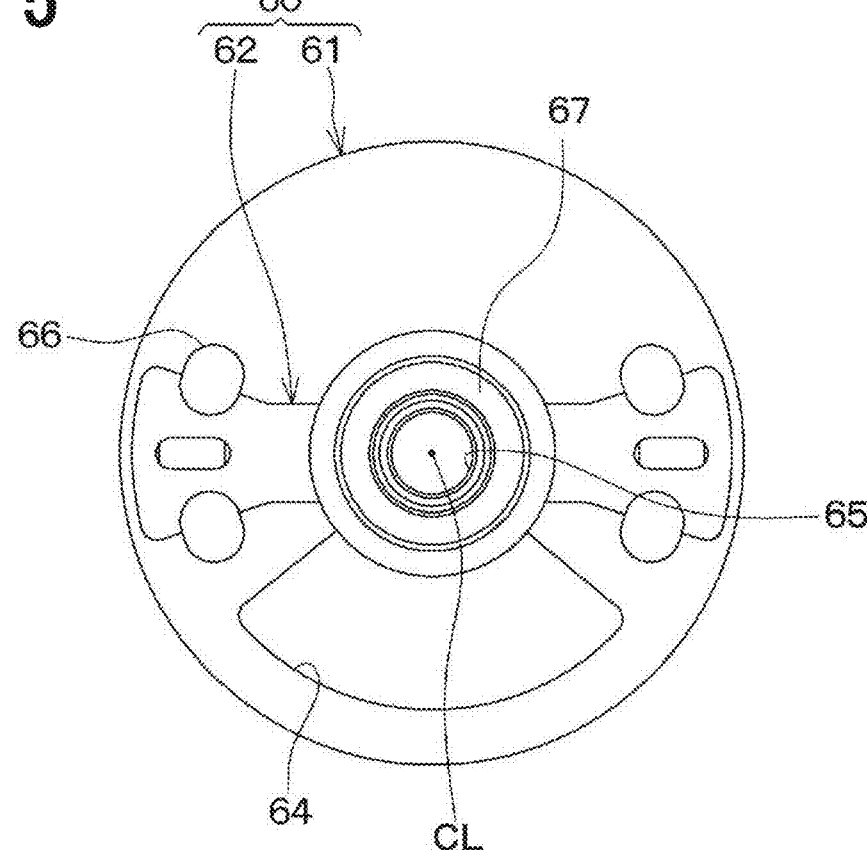
FIG. 5 is a plan view of a movable valve of the valve device.

As shown in FIGS. 3 and 5, the movable valve 60 is placed on the side of the stationary disk 70 where the inlet-side space 210 is placed. The movable valve 60 includes a movable disk 61, which serves as a valve element, and a lever 62, which is fixed to the movable disk 61. The movable disk 61 is shaped in a circular disk form and is made of, for example, ceramic. The movable disk 61 and the stationary disk 70 are configured to slide relative to each other. A surface 63 of the movable disk 61, which faces the stationary disk 70, slidably contacts a surface 75 of the stationary disk 70, which faces the movable disk 61, so that the surface 63 of the movable disk 61 serves as a seal surface which seals the passage openings 71, 72 of the stationary disk 70. Furthermore, the movable disk 61 has an opening 64 which penetrates through the movable disk 61 in a plate thickness direction thereof. Therefore, the movable valve 60 is configured to be rotated about the central axis CL to open and close each of the first passage opening 71 and the second passage opening 72 of the stationary disk 70 and adjust a size of a cross-sectional area of the first passage opening 71 and a size of a cross-sectional area of the second passage opening 72.

When the opening 64 of the movable disk 61 and the first passage opening 71 of the stationary disk 70 are communicated with each other, the fluid flows from the inlet-side space 210 to the first outlet-side space 211. Furthermore, when the opening 64 of the movable disk 61 and the second passage opening 72 of the stationary disk 70 are communicated with each other, the fluid flows from the inlet-side space 210 to the second outlet-side space. Furthermore, the movable valve 60 adjusts the size of the cross-sectional area of the first passage opening 71 and the size of the cross-sectional area of the second passage opening 72 at the stationary disk 70 to control a flow rate of the fluid from the inlet-side space 210 to the first outlet-side space 211 and a flow rate of the fluid from the inlet-side space 210 to the second outlet-side space.

The lever 62, which is fixed to the movable disk 61, couples between the movable disk 61 and the shaft 50 in a state where the movable disk 61 is displaceable in the axial direction. Therefore, when the shaft 50 is driven by the drive device 80 to rotate about the central axis CL, the movable valve 60 is also rotated about the central axis CL in response to the rotation of the shaft 50. A through-hole 65, through which the rod 51 of the shaft 50 is inserted, is formed at a center of the movable valve 60.

As shown in FIG. 3, the compression spring 90 is placed in a space formed between the rod 51 and the holder 52 of the shaft 50. One end portion of the compression spring 90, which faces the one side in the axial direction, contacts a surface of the holder 52, which faces the other side in the axial direction, and the other end portion of the compression spring 90 contacts a spring receiver 67 of the lever 62 of the movable valve 60. The compression spring 90 urges the movable valve 60 toward the stationary disk 70. A state, in which the movable disk 61 and the stationary disk 70 make a surface-to-surface contact therebetween, is maintained by an urging force of the compression spring 90.

The first torsion spring 91 is placed on the radially outer side of the holder 52 of the shaft 50. One end portion of the first torsion spring 91, which faces the one side in the axial direction, is anchored to an anchoring portion (not shown) of the first housing 11, and the other end portion of the first torsion spring 91 is anchored to an anchoring portion (not shown) of the holder 52. The first torsion spring 91 urges the shaft 50 relative to the housing 10 in the circumferential direction. Rattling between the drive device 80 and the shaft 50 in the circumferential direction is limited by an urging force of the first torsion spring 91.

The second torsion spring 92 is placed on the movable valve 60 side of the first torsion spring 91. One end portion of the second torsion spring 92, which faces the one side in the axial direction, is anchored to an anchoring portion (not shown) of the holder 52, and the other end portion of the second torsion spring 92 is anchored to an anchoring portion 66 of the lever 62. The second torsion spring 92 urges the movable valve 60 relative to the shaft 50 in the circumferential direction. Rattling between the shaft 50 and the movable valve 60 in the circumferential direction is limited by an urging force of the second torsion spring 92.

Next, details of the structure of the first housing 11 will be described.

As shown in FIGS. 6 to 9, the first housing 11 is integrally molded by injection molding to integrally have the plate portion 12, the fitting tubular portion 13, the boss 30, the plurality of ribs 31, the intermediate tubular portion 14 and the plurality of fastening portions 15 described above. The first housing 11 is made of, for example, polyphenylene sulfide (hereinafter referred to as PPS).

The first housing 11 has a plurality of gate marks 18, each of which is a trace of a site of the first housing 11 where molten resin is injected into a molding die at a time of injection molding of the first housing 11. Each of the gate marks 18 is formed at a corresponding location of the first housing 11 which is offset from the central axis CL of the boss 30. Specifically, the gate marks 18 are located on the radially outer side of the intermediate tubular portion 14 and are spaced from one another in the circumferential direction. Each of the gate marks 18 is placed adjacent to a corresponding connection between the intermediate tubular portion 14 and a corresponding one of the fastening portions 15. Each of the gate marks 18 is formed at an end part of a cylindrical portion 19, which is shaped in a cylindrical form and extends in the axial direction at the corresponding connection between the intermediate tubular portion 14 and the corresponding one of the fastening portions 15.

The fastening portions 15 are located on the radially outer side of the boss 30 and are spaced from one another in the circumferential direction. The fastening portions 15 radially outwardly extend from the intermediate tubular portion 14. The number of the gate marks 18 is the same as the number of the fastening portions 15. In the present embodiment, the number of the gate marks 18 is three, and the number of the fastening portions 15 is three.

Figure 9:
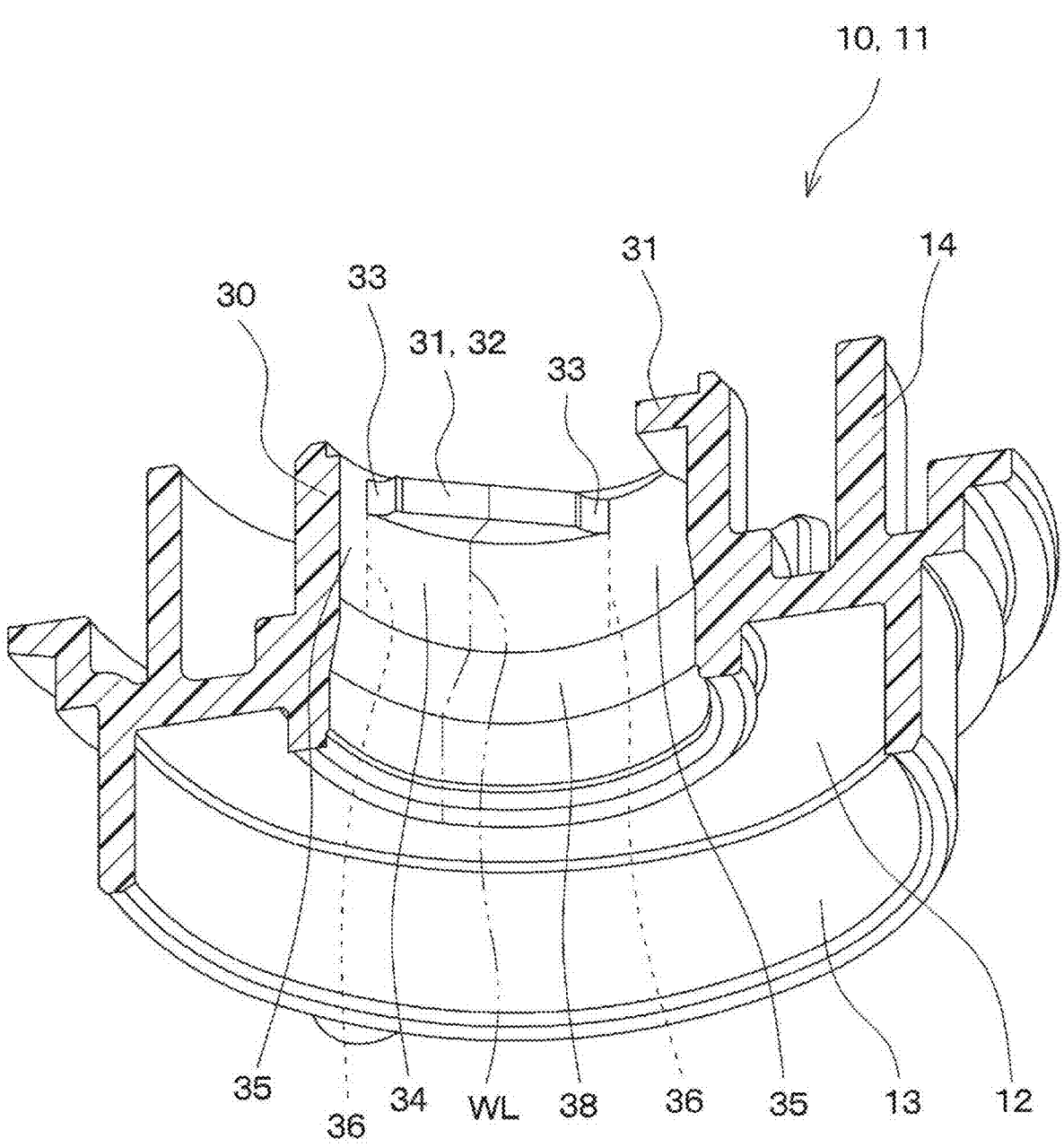
FIG. 9 is a perspective view including a cross-section taken along line IX-IX in FIG. 7.

When the molten resin is injected into the molding die through the gates at the time of injection molding of the first housing 11, the molten resin flows into the fastening portions 15, the intermediate tubular portion 14 and the plate portion 12 and further flows into the boss 30 and the ribs 31 to form those portions. In the present embodiment, since the number of the gate marks 18 is the same as the number of the fastening portions 15, the molten resin injected from each of the gates into the molding die can reach the boss 30 at the same timing. Flows of the molten resin, which are respectively injected from the gates and reach the boss 30, may meet at corresponding portions of the boss 30 and form welds. The weld is also referred to as a weld line. In FIG. 9, one example of the corresponding portion, at which the weld is formed, is indicated by a dot-dot-dash line WL. As shown in FIG. 9, the weld is formed at the location that includes the rib 31.

Each of the ribs 31 is placed at the one end portion of the boss 30 in the axial direction and radially inwardly projects from the inner peripheral wall 37 of the boss 30. Each of the ribs 31 is placed at a corresponding location of the boss 30 which is between corresponding circumferentially adjacent two of the gate marks 18. Specifically, the ribs 31 are formed at the corresponding portions, at which the welds are respectively formed. It may be said that the gate marks 18 described above are arranged such that each of the welds is formed at the corresponding location that includes the corresponding one of the ribs 31. The number of the ribs 31 is the same as the number of the gate marks 18. In the present embodiment, the number of the ribs 31 is three, and the number of the gate marks 18 is three. In the present embodiment, the ribs 31 are arranged at equal intervals in the circumferential direction of the boss 30. In the present description, the term "equal intervals" means "substantially equal intervals" within a range that includes a manufacturing error.

Figure 8:
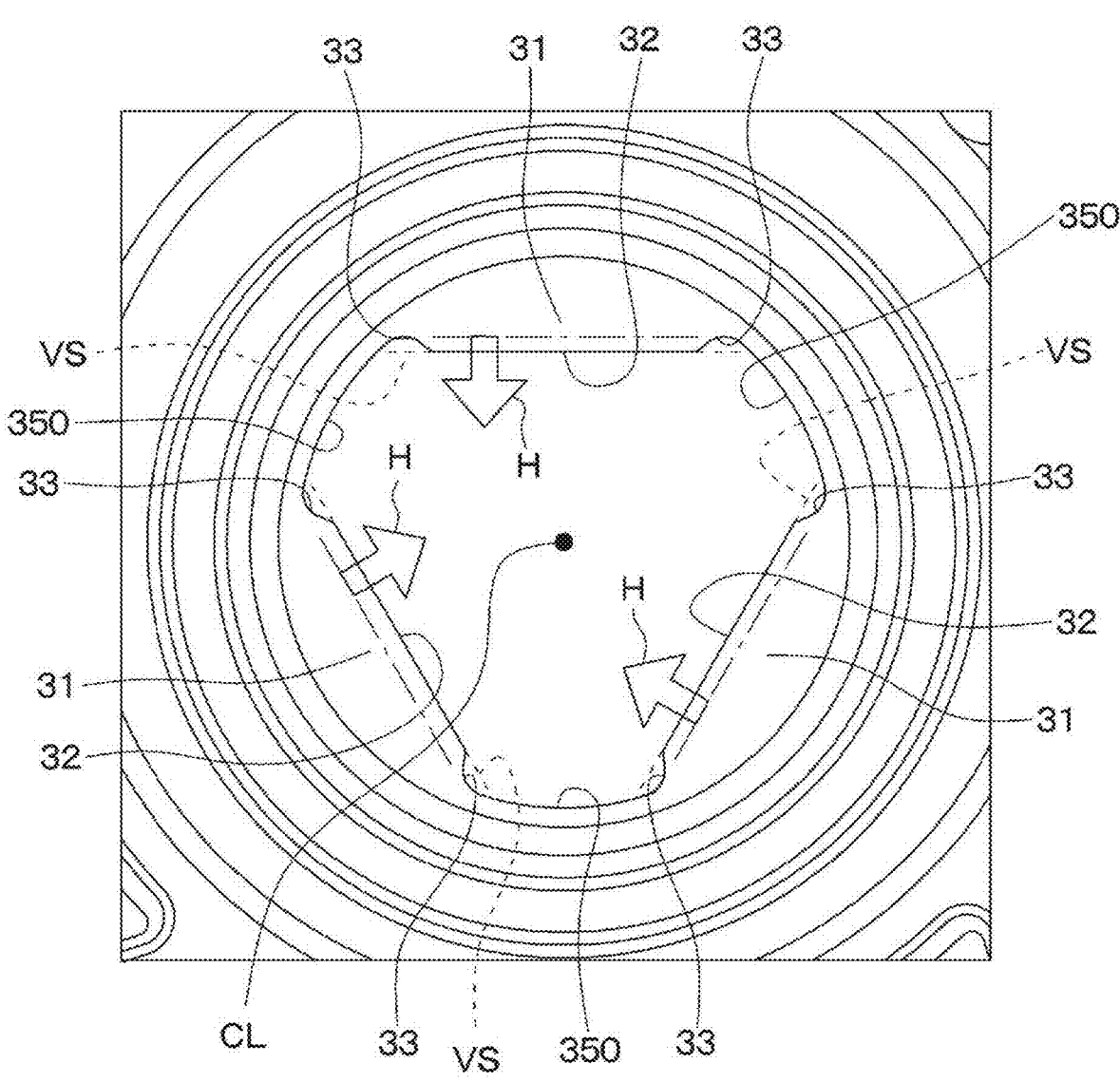
FIG. 8 is an enlarged view of a portion VIII in FIG. 7.

As shown in FIGS. 8 and 9, each of the ribs 31 has an inward-facing surface 32, which radially faces an inside of the boss 30, and two curved surfaces 33 which are respectively formed at two circumferentially opposite ends of the inward-facing surface 32. In the present embodiment, the inward-facing surface 32 extends perpendicular to a line which connects between a center of the rib 31 and the central axis CL. At each of the ribs 31, each of the curved surfaces 33 is recessed away from an imaginary surface VS, which is formed by extending the inward-facing surface 32, to circumferentially enlarge an adjacent one of a plurality of rib-less portions 350 of the boss 30, which is adjacent to the curved surface 33 and has none of the ribs 31. In the present embodiment, the imaginary surface VS, which is formed by extending the inward-facing surface 32, is an imaginary plane that is perpendicular to the line connecting between the center of the rib 31 and the central axis CL and extends through the circumferential end portion of the inward-facing surface 32. By forming the curved surfaces 33 at the two circumferentially opposite ends, respectively, of the inward-facing surface 32 of the rib 31, it is possible to ensure a projecting height of the rib 31, which is radially inwardly measured from the inner peripheral wall 37 of the boss 30, as indicated by an arrow H in FIG. 8.

In the following description, as shown in FIG. 9, each portion of the boss 30, which includes a corresponding one of the ribs 31, is extended in the axial direction to form a region called as a reinforced portion 34, and each remaining region of the boss 30, which is other than the reinforced portions 34, is called as an unreinforced portion 35. In FIG. 9, a boundary between each reinforced portion 34 and the unreinforced portion 35 placed adjacent to the reinforced portion 34 is indicated by a dotted line 36. In the present embodiment, since the ribs 31 are arranged at equal intervals in the circumferential direction, the reinforced portions 34 are arranged at equal intervals in the circumferential direction of the boss 30, and the unreinforced portions 35 are also arranged at equal intervals in the circumferential direction of the boss 30.

Figure 10A:
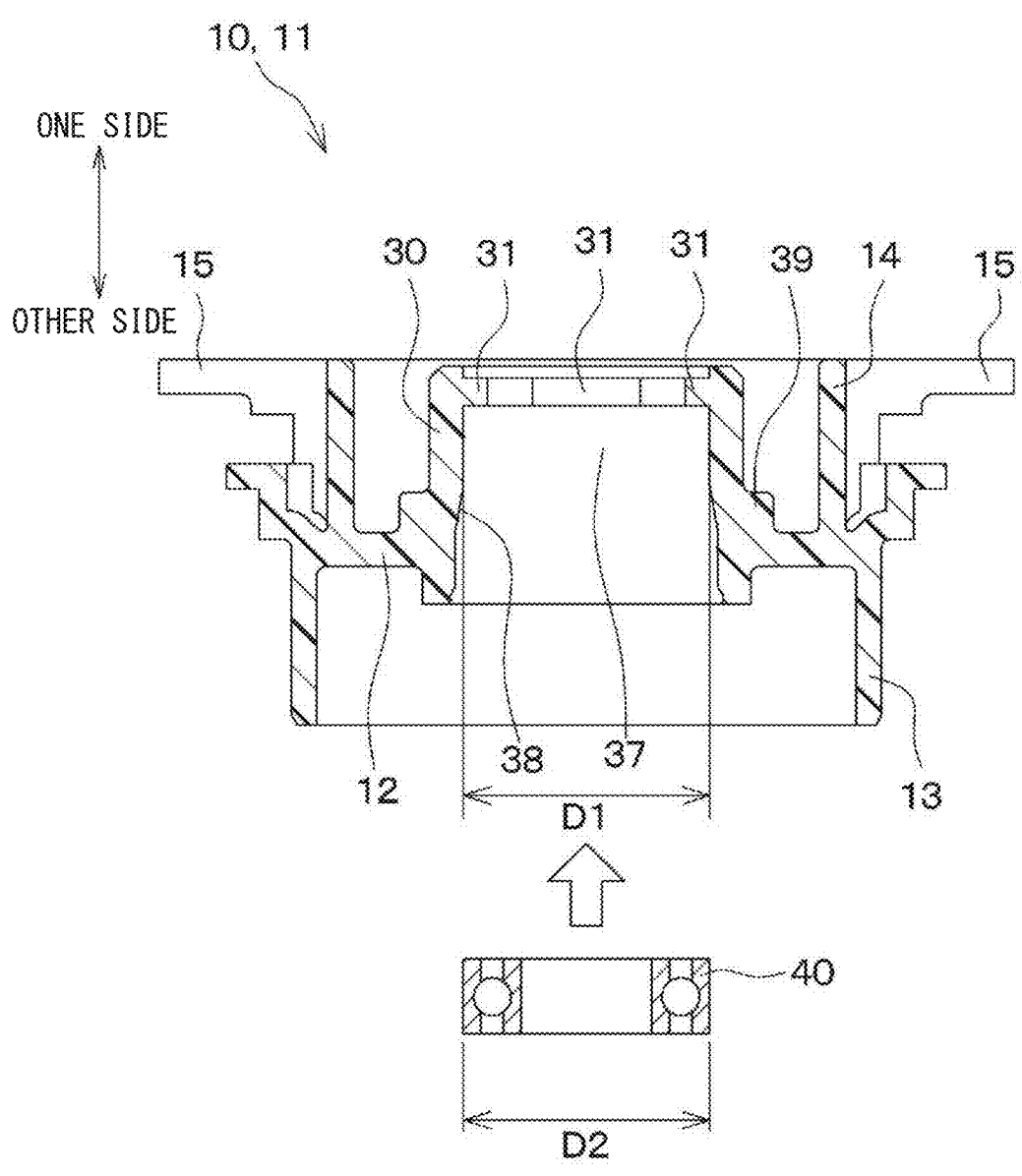
FIG. 10A is an explanation view for explaining a process of press-fitting a bearing to a boss of the first housing.
Figure 10B:
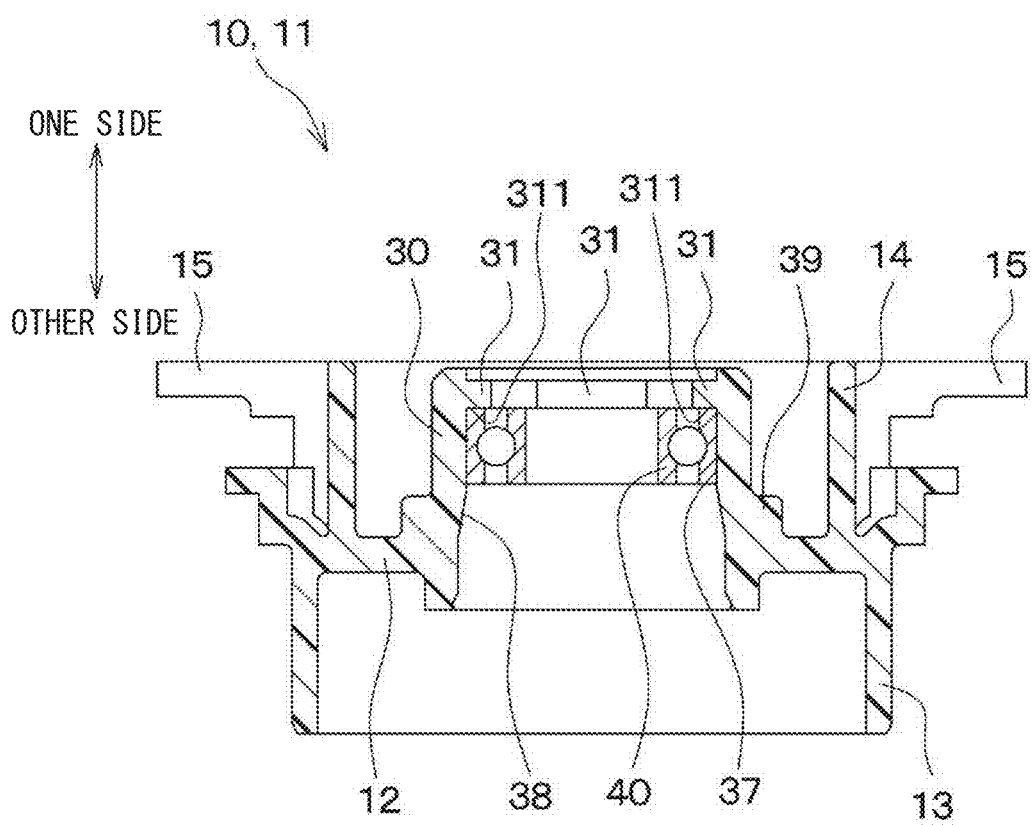
FIG. 10B is an explanation view for explaining the process of press-fitting the bearing to the boss of the first housing.

Next, the technical significance of the structure, in which the reinforced portions 34 and the unreinforced portions 35 are formed at the boss 30 of the first housing 11 of the present embodiment, will be described. As shown in FIGS. 10A and 10B, manufacturing of the valve device 1 includes a process of press-fitting the bearing 40 to the inner peripheral wall 37 of the boss 30.

As shown in FIG. 10A, in a state before the press-fitting of the bearing 40 to the inner peripheral wall 37 of the boss 30, an outer diameter D2 of the bearing 40 is slightly larger than an inner diameter D1 of the inner peripheral wall 37 of the boss 30. Therefore, a portion 38 of the boss 30, which is on the other side of a press-fitting portion of the boss 30 press-fitted with the bearing 40, is shaped in a tapered form, an inner diameter of which is progressively decreased from the other side toward the one side in the axial direction. With this configuration, the bearing 40 can be easily press-fitted to the inner peripheral wall 37 of the boss 30.

At the time of press-fitting the bearing 40 to the inner peripheral wall 37 of the boss 30, the boss 30 is deformed such that the inner diameter D1 of the boss 30 is radially outwardly enlarged. In the present embodiment, at this time, among the portions of the boss 30, mainly the unreinforced portions 35 are deformed to be expanded toward the radially outer side, and deformation of each of the reinforced portions 34 is limited by the rib 31. Thus, a stress, which is applied to the weld formed at each of the reinforced portions 34, becomes small, and thereby the generation of the crack at the boss 30 can be limited. Furthermore, since the reinforced portions 34 and the unreinforced portions 35 are respectively arranged at equal intervals in the circumferential direction of the boss 30, the amounts of deformation of the unreinforced portions 35 at the time of press-fitting the bearing 40 can be made equal to each other. Thus, it is possible to achieve both of the circularity and the strength of the boss 30.

Also, as shown in FIG. 10B, at the time of press-fitting the bearing 40 to the inner peripheral wall 37 of the boss 30, the ribs 31 can be used as a stopper that limits movement of the bearing 40 toward the one side in the axial direction. In such a case, surfaces 311 of the ribs 31, which face toward the other side in the axial direction, contact a surface of the bearing 40 which faces toward the one side in the axial direction.

Furthermore, at the time of press-fitting the bearing 40 to the inner peripheral wall 37 of the boss 30, a portion of the boss 30, which is located on the other side of the bearing 40 in the axial direction, may possibly be expanded toward the radially outer side. With respect to this point, in the present embodiment, the first housing 11 has a thick-wall portion 39 on the radially outer side of the boss 30, and the thick-wall portion 39 has an increased wall thickness, which is radially outwardly increased, in comparison to an adjacent portion of the first housing 11 placed adjacent to the thick-wall portion 39. The thick-wall portion 39 is placed on the other side of the bearing 40, which is opposite to the ribs 31 in the axial direction. Therefore, at the time of press-fitting the bearing 40 to the inner peripheral wall 37 of the boss 30, the thick-wall portion 39 can limit the radially outward expansion of the boss 30.

For the purpose of comparing with the valve device 1 of the present embodiment, a structure of a first housing 11 of a valve device of a comparative example will be described.

This comparative example is created by the inventors of the present disclosure and is not the prior art.

Figure 16:
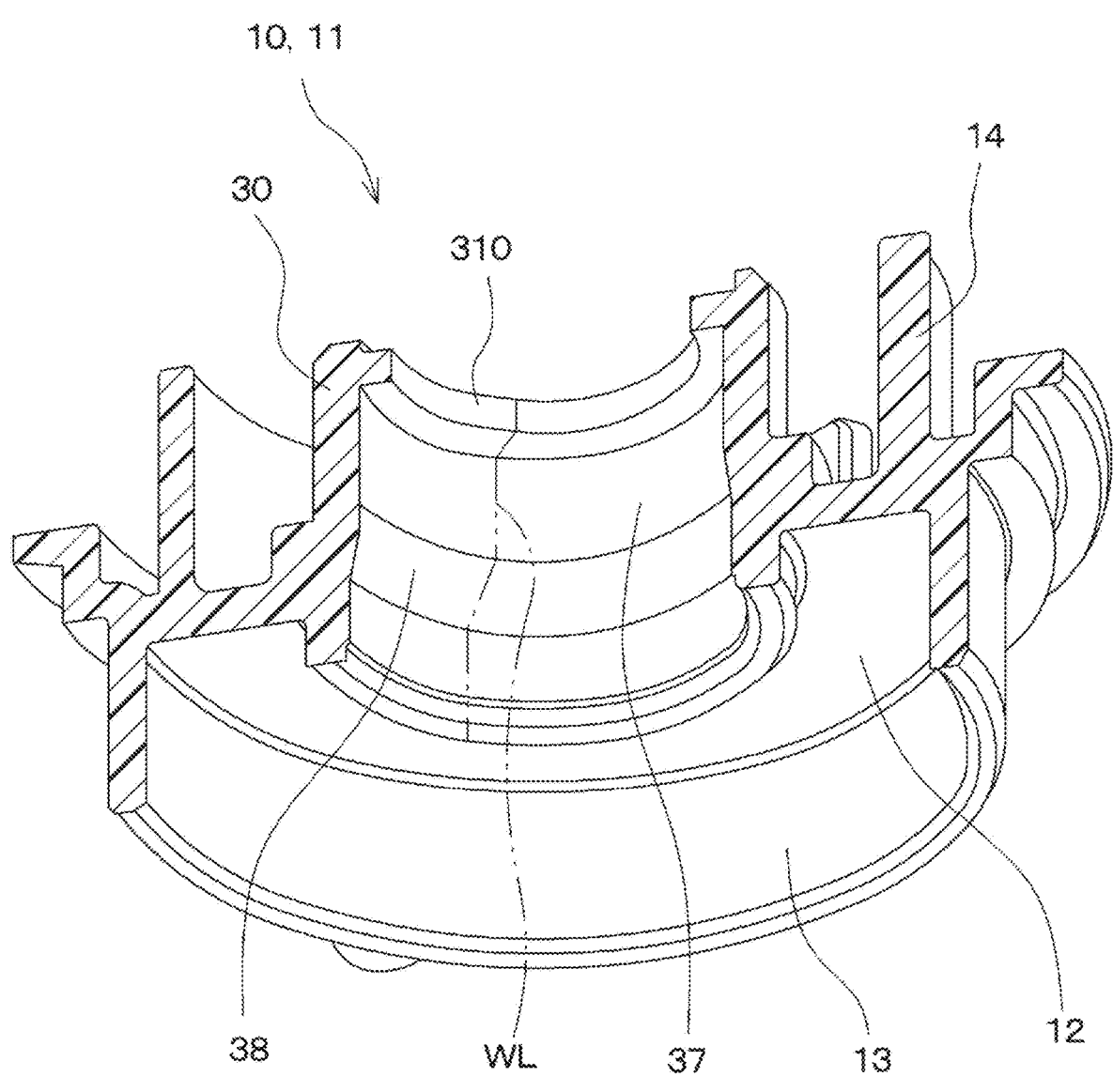
FIG. 16 is a perspective view including a cross-section of a first housing of a valve device of a comparative example.

As shown in FIG. 16, in the first housing 11 of the valve device of the comparative example, a rib 310, which radially inwardly projects from the inner peripheral wall 37 of the boss 30, circumferentially extends all along the inner peripheral wall 37 of the boss 30. Therefore, in the comparative example, the strength of the boss 30 is uniformly increased along the entire circumferential extent of the boss 30. The rest of the structure of the valve device of the comparative example is the same as that of the valve device 1 of the present embodiment. Even in FIG. 16, one example of the portion, at which the weld is formed, is indicated by a dot-dot-dash line WL at the boss 30.

During the manufacturing of the valve device of the comparative example, at the time of press-fitting the bearing 40 to the inner peripheral wall 37 of the boss 30, the boss 30 is deformed such that the inner diameter D1 of the boss 30 expands radially outward uniformly over the entire circumferential extent of the boss 30. Therefore, in the comparative example, a large stress is applied to the weld formed at the portion of the boss 30 to possibly cause generation of a crack at the boss 30. If the crack is generated at the boss 30 of the first housing 11 to result in the variation in the radial position of the shaft 50, the accuracy of the flow rate control by the movable valve 60 fixed to the shaft 50 may possibly be deteriorated.

In contrast to the valve device of the comparative example, the valve device 1 of the present embodiment provides the following advantages.

The first housing 11 of the valve device 1 of the present embodiment is made of the resin, and the boss 30, which is shaped in the tubular form, is injection molded integrally with the first housing 11. Each of the gate marks 18 is formed at the corresponding location of the first housing 11 which is offset from the central axis CL of the boss 30. Each of the ribs 31, which radially inwardly projects from the inner peripheral wall 37 of the boss 30, is placed at the corresponding location of the boss 30 which is between the corresponding circumferentially adjacent two of the gate marks 18. The boss 30 has the reinforced portions 34, at each of which the corresponding one of the ribs 31 is placed, and the unreinforced portions 35, at each of which none of the ribs 31 is placed.

According to the above configuration, in the case where each of the gate marks is formed at the corresponding location of the first housing 11 which is offset from the central axis CL of the boss 30, the weld may be formed at the boss 30. By placing the rib 31 at the location where the weld is generated, the press-fit strength of the boss 30 at the time of press-fitting the bearing 40 to the inner peripheral wall 37 of the boss 30 can be improved.

Furthermore, since each of the ribs 31 strengthens only the corresponding weld portion, which has the low resin strength at the boss 30, the boss 30 has the reinforced portions 34 and the unreinforced portions 35. The deformation of the boss 30 at the time of press-fitting the bearing 40 to the boss 30 is made such that the amount of deformation of the unreinforced portion 35, which has the high resin strength at the boss 30, is increased by the amount that corresponds to the amount of reduction in the amount of deformation of the reinforced portion 34, which has the low resin strength at the boss 30. Therefore, it is possible to adjust the strength balance when the resin strength in view of the presence of the weld at the boss 30 and the shape strength in view of the presence of the ribs 31 at the boss 30 are considered together, thereby overcoming the weak point of the resin strength of the weld portion. Therefore, generation of the crack at the boss 30 is limited to achieve the press-fitting and the holding of the bearing 40 by the boss 30, thereby reducing the variation in the radial position of the shaft 50. As a result, the size of the cross-sectional area of the respective passage openings 71, 72 can be controlled with high precision by the movable valve 60 fixed to the shaft 50, thereby improving the accuracy of flow rate control.

Furthermore, the valve device 1 of the present embodiment provides the following advantages.

(1) In the present embodiment, the shaft 50 is rotatably supported by the bearing 40 which serves as the ring member. Thereby, the bearing 40 is exemplified as the ring member which is press-fitted to and is held by the boss 30 of the first housing 11. The bearing 40 (specifically, the ball bearing, a plain bearing or the like), which rigidly supports the shaft 50, is a member that particularly promotes the resin deformation, and the effect of improving the strength by the ribs 31 is significant. Therefore, the valve device 1 limits the variation in the radial position of the bearing 40 to limit the variation in the radial position of the shaft 50. Thus, the accuracy of the flow rate control by the movable valve 60 can be improved.

(2) In the present embodiment, each of the ribs 31 has the inward-facing surface 32, which radially faces the inside of the boss 30, and the curved surfaces 33 which are respectively formed at the circumferentially opposite ends of the inward-facing surface 32. At each of the ribs 31, each of the curved surfaces 33 is recessed away from the imaginary surface VS, which is formed by extending the inward-facing surface 32, to circumferentially enlarge the adjacent rib-less portion 350 of the boss 30 which is adjacent to the curved surface 33 and has none of the ribs 31.

With this configuration, the circumferential size of the unreinforced portion 35 can be ensured, and the projecting height of the rib 31, which is radially inwardly measured from the inner peripheral wall 37 of the boss 30, can be ensured. Thus, at the time of press-fitting the bearing 40 to the boss 30, the unreinforced portion 35, which has the ensured circumferential size, can take the deformation at the time of press-fitting, and the rib 31, which has the ensured projecting height, can limit the deformation at the reinforced portion 34. Thus, the stress concentration at the weld can be reliably limited.

(3) In the present embodiment, the first housing 11 has the fastening portions 15 which are configured to couple the first housing 11 to the other component. The fastening portions 15 are located on the radially outer side of the boss 30 and are spaced from one another in the circumferential direction. The number of the fastening portions 15 is the same as the number of the gate marks 18.

With this configuration, the molten resin injected from each of the gates into the molding die at the time of injection molding can reach the boss 30 at the same timing. Thus, the unreinforced portions 35 and the reinforced portions 34 can be respectively arranged at the equal intervals in the circumferential direction. Thereby, at the time of press-fitting the bearing 40 to the inner peripheral wall 37 of the boss 30, the amounts of deformation of the unreinforced portions 35 can be made equal to each other. Thus, it is possible to achieve both of the circularity and the strength of the boss 30.

(4) In the present embodiment, the weld, which is the trace of the site where the flows of the molten resin meet each other at the time of injection molding of the first housing 11, is formed at the location which includes the rib 31 at the boss 30.

With this configuration, each of the ribs 31 is placed at the corresponding location of the boss 30 which is between the corresponding circumferentially adjacent two of the gate marks 18. Thus, in the case where the welds are formed at the time of injection molding of the first housing 11, each of the welds is formed at the location which includes the corresponding one of the ribs 31.

(4) In the present embodiment, it is preferable to use, for example, the PPS as the resin which forms the first housing 11.

Thereby, the PPS is exemplified as the resin which forms the first housing 11. The PPS has high strength and high stiffness and is excellent in heat resistance. Furthermore, the PPS has low water absorption and is excellent in dimensional stability. Thus, the PPS is suitable as the material of the first housing 11 which is integrally molded with the boss 30 in the valve device 1.

(5) In the present embodiment, the surface of the bearing 40, which faces the axial direction, contacts the ribs 31.

With this configuration, at the time of press-fitting the bearing 40 to the inner peripheral wall 37 of the boss 30, the ribs 31 can be used as the positioning stopper.

(6) In the present embodiment, the first housing 11 has the thick-wall portion 39 on the radially outer side of the boss 30, and the thick-wall portion 39 has the increased wall thickness in comparison to the adjacent portion of the first housing 11 placed adjacent to the thick-wall portion 39. The ribs 31 are placed on the opposite side of the bearing 40, which is opposite to the thick-wall portion 39 in the axial direction.

Therefore, at the time of press-fitting the bearing 40 to the inner peripheral wall 37 of the boss 30, the thick-wall portion 39 can limit the radially outward expansion of the boss 30.

Second to Fifth Embodiments

The second to fifth embodiments are modifications of the first embodiment, in which the configurations of the gate mark 18 and the ribs 31 are changed from those of the first embodiment, and the rest of each of the second to fifth embodiments is the same as that of the first embodiment. Therefore, only the portions, which are different from those of the first embodiment will be described in the second to fifth embodiments. In FIGS. 11 to 14, which are referred to in the description of the second to fifth embodiments, only the plate portion 12, the boss 30, the gate mark(s) 18 and the rib(s) 31 provided to the first housing 11 are shown, and the other components are omitted. Furthermore, in FIGS. 11 to 14, an example of a site where the weld is formed is indicated by an X mark along with the reference sign WL.

Second Embodiment

Figure 11:
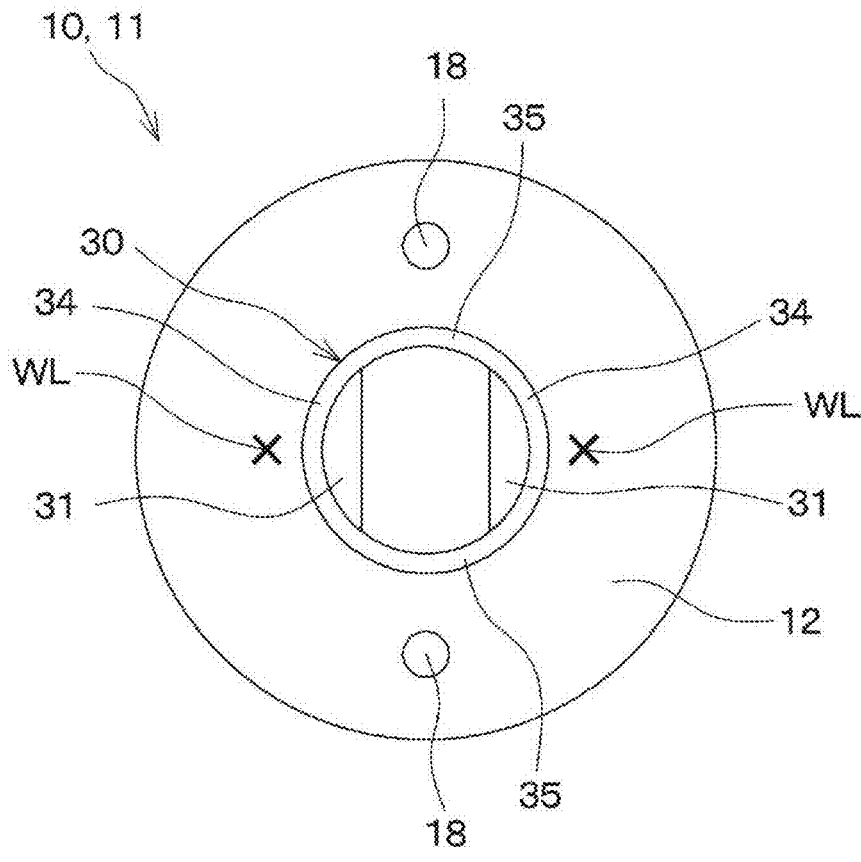
FIG. 11 is a plan view showing an outline of a first housing of a valve device of a second embodiment.

As shown in FIG. 11, the first housing 11 of the valve device 1 of the second embodiment has two gate marks 18 and two ribs 31. Specifically, the number of the ribs 31 is the same as the number of the gate marks 18.

The two gate marks 18 are located on the radially outer side of the boss 30 and are spaced from one another in the circumferential direction. In this case, each of two welds is formed between the two gate marks 18 at the boss 30. Each of the ribs 31 is formed at the corresponding location at which the corresponding one of the welds is formed. The two ribs 31 are respectively formed at the two locations which are opposed to each other about the central axis CL. Specifically, the two ribs 31 are arranged at equal intervals in the circumferential direction of the boss 30.

Even in the second embodiment described above, the reinforced portions 34, which respectively have the ribs 31, and the unreinforced portions 35, which do not have any of the ribs 31, are respectively arranged at equal intervals in the circumferential direction. Therefore, the valve device 1 of the second embodiment can achieve the same advantages as those of the first embodiment.

Third Embodiment

Figure 12:
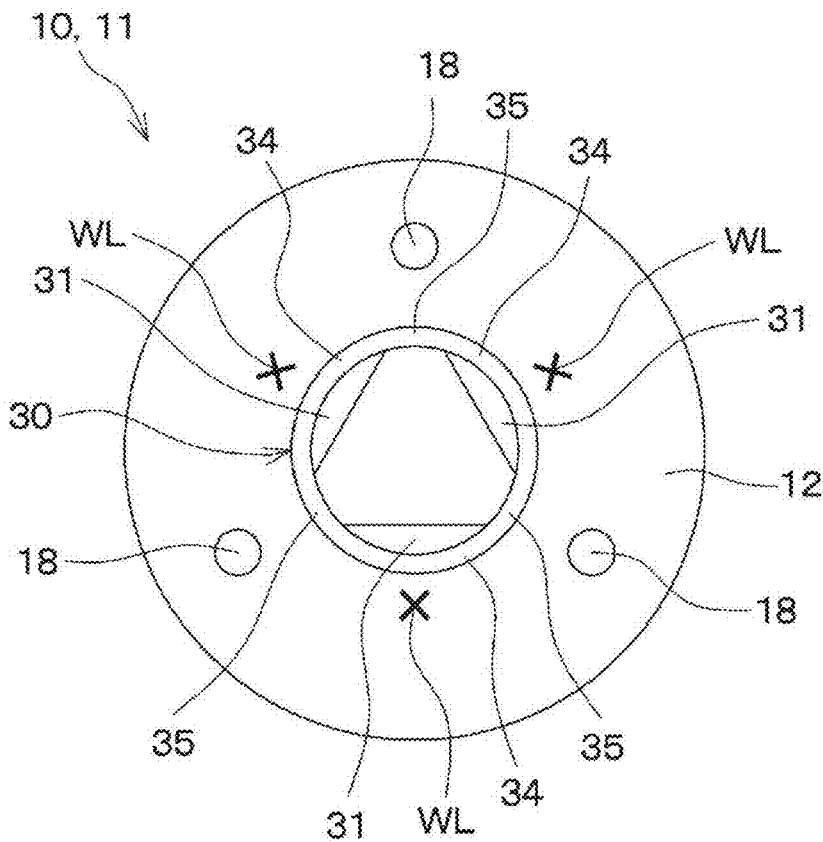
FIG. 12 is a plan view showing an outline of a first housing of a valve device of a third embodiment.

As shown in FIG. 12, the first housing 11 of the valve device 1 of the third embodiment has three gate marks 18 and three ribs 31. Specifically, the number of the ribs 31 is the same as the number of the gate marks 18.

The three gate marks 18 are located on the radially outer side of the boss 30 and are spaced from one another in the circumferential direction. In this case, each of three welds is formed between corresponding circumferentially adjacent two of the gate marks 18 at the boss 30. Each of the ribs 31 is formed at the corresponding location at which the corresponding one of the welds is formed. The three ribs 31 are arranged at equal intervals in the circumferential direction of the boss 30.

Even in the third embodiment described above, the reinforced portions 34, which respectively have the ribs 31, and the unreinforced portions 35, which do not have any of the ribs 31, are respectively arranged at equal intervals in the circumferential direction at the boss. Therefore, the valve device 1 of the third embodiment can achieve the same advantages as those of the first embodiment.

Fourth Embodiment

Figure 13:
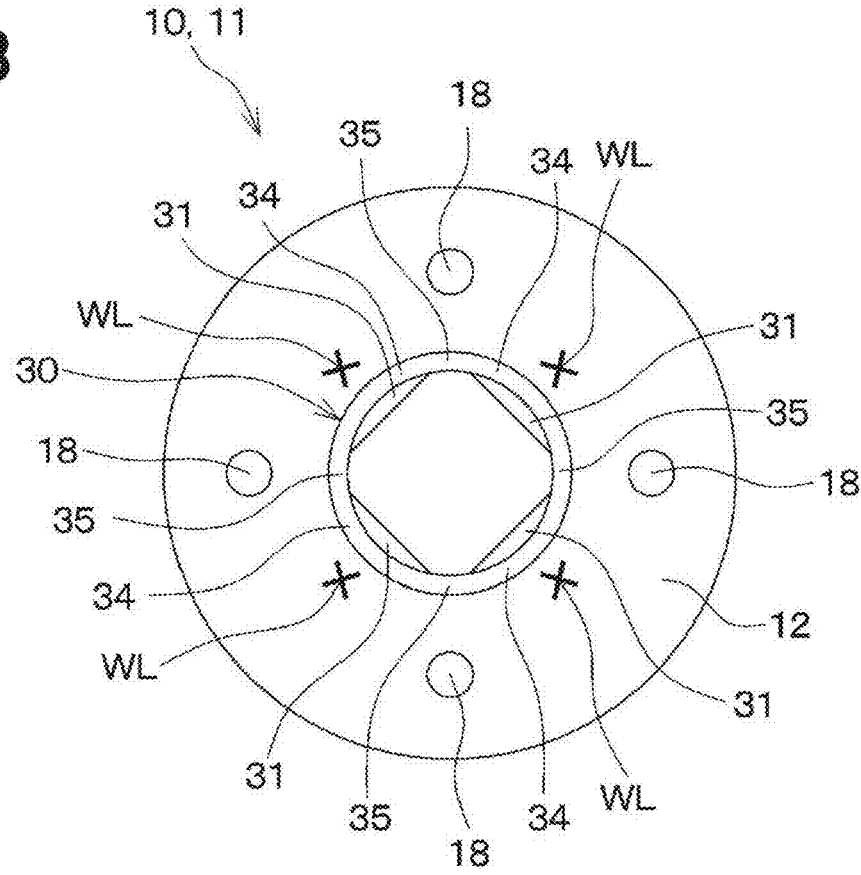
FIG. 13 is a plan view showing an outline of a first housing of a valve device of a fourth embodiment.

As shown in FIG. 13, the first housing 11 of the valve device 1 of the fourth embodiment has four gate marks 18 and four ribs 31. Specifically, the number of the ribs 31 is the same as the number of the gate marks 18.

The four gate marks 18 are located on the radially outer side of the boss 30 and are spaced from one another in the circumferential direction. In this case, each of four welds is formed between corresponding circumferentially adjacent two of the gate marks 18 at the boss 30. Each of the ribs 31 is formed at the corresponding location at which the corresponding one of the welds is formed. The four ribs 31 are arranged at equal intervals in the circumferential direction of the boss 30.

Even in the fourth embodiment described above, the reinforced portions 34, which respectively have the ribs 31, and the unreinforced portions 35, which do not have any of the ribs 31, are respectively arranged at equal intervals in the circumferential direction at the boss. Therefore, the valve device 1 of the fourth embodiment can achieve the same advantages as those of the first embodiment.

Fifth Embodiment

Figure 14:
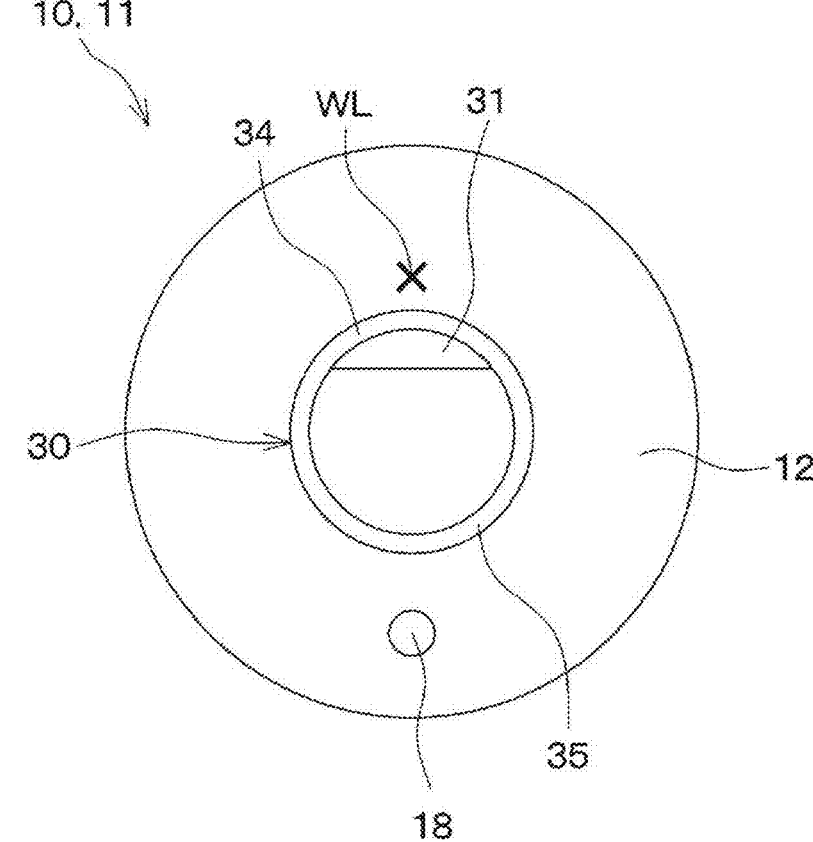
FIG. 14 is a plan view showing an outline of a first housing of a valve device of a fifth embodiment.

As shown in FIG. 14, the first housing 11 of the valve device 1 of the fifth embodiment has one gate mark (single gate mark) 18 and one rib (single rib) 31. Specifically, the number of the rib 31 is the same as the number of the gate mark 18.

The one gate mark 18 is located on the radially outer side of the boss 30. In this case, at the boss 30, a weld is formed at a location that is substantially opposed to the gate mark 18 about the central axis CL. The rib 31 is formed at this location at which the weld is formed.

Even in the fifth embodiment described above, the reinforced portion 34, which has the rib 31, and the unreinforced portion 35, which does not have the rib 35, are present at the boss. Therefore, the valve device 1 of the fifth embodiment can achieve the same advantages as those of the first embodiment.

Other Embodiments (1) In each of the embodiments described above, the housing 10 includes the first housing 11 and the second housing 20. However, the present disclosure is not limited to this configuration. For example, the housing 10 may be formed such that the first housing 11 and the second housing 20 are formed integrally in one-piece.

(2) In each of the embodiments described above, the first housing 11, which serves as the housing 10, has the plate portion 12, the fitting tubular portion 13, the boss 30, the rib(s) 31, the intermediate tubular portion 14 and the fastening portions 15. For example, it may be only required that the housing 10 has at least the boss 30 and the rib(s) 31.

Figure 15:
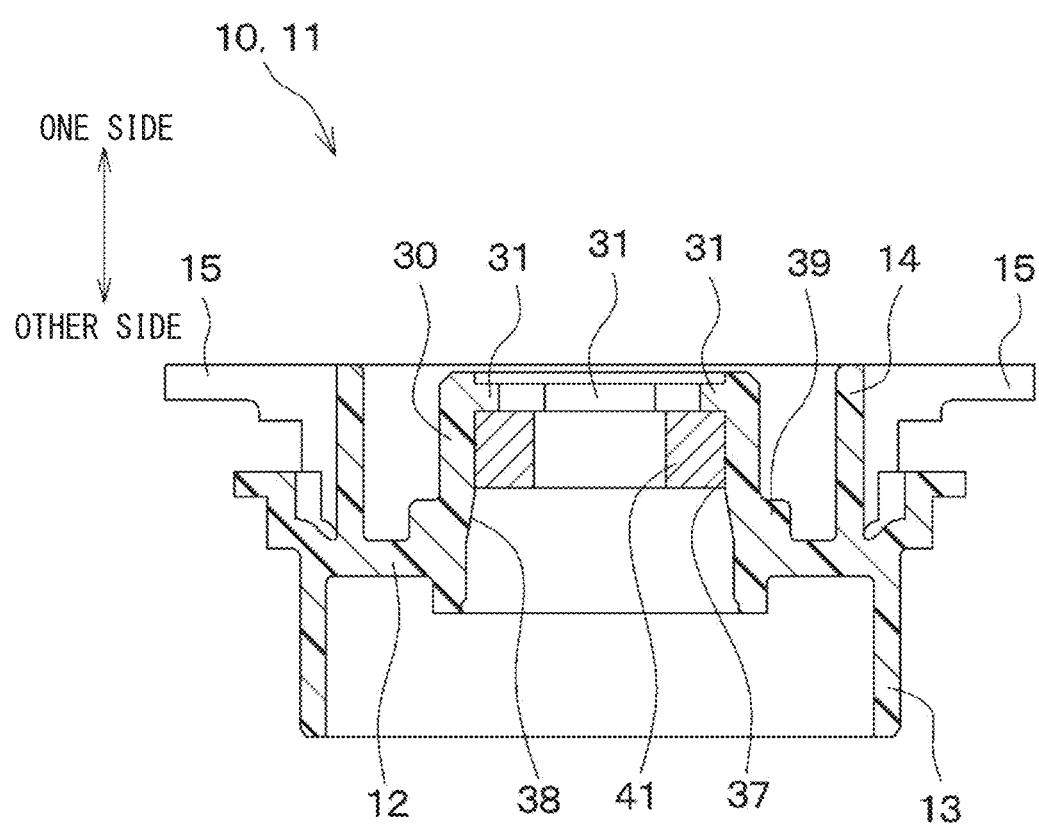
FIG. 15 is a perspective view showing a state where a seal member is press-fitted to a boss of a first housing according to another embodiment.

(3) In each of the embodiments described above, the ring member, which is press-fitted to and is held by the inner peripheral wall 37 of the boss 30, is described as the bearing 40. However, the present disclosure is not limited to this configuration. For example, as shown in FIG. 15, the ring member may be, for example, a seal member 41 or the like.

With this configuration, a sealing performance can be improved because an upper limit of the press-fit allowance can be increased by improving the strength against cracking caused by press-fitting with aid of the ribs 31 formed at the boss 30.

(4) In each of the embodiments described above, the bearing 40, which serves as the ring member press-fitted to and held by the inner peripheral wall 37 of the boss 30, is described as the ball bearing. However, the present disclosure is not limited to this configuration. For example, a plain bearing, a roller bearing, a needle bearing, or a slide bearing may be used as the bearing 40.

(5) In each of the embodiments described above, the valve device 1 is described as being used in the fluid circulation circuit of the electric vehicle. However, the present disclosure is not limited to this application. For example, the valve device 1 may be used in a variety of applications to enable, block, flow passage change, and control a flow rate of a fluid in a fluid circulation circuit of a device or machine other than the electric vehicle.

(6) In each of the embodiments described above, the first housing 11 is made of the PPS. However, the material of the first housing 11 is not limited to this. The resin, which forms the first housing 11, may be selected arbitrarily.

The present disclosure is not limited to the above-described embodiments and may be modified appropriately. Further, the above embodiments are not unrelated to each other and can be appropriately combined unless the combination is clearly impossible. Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the shape, the positional relationship or the like of the constituent elements of the embodiment are mentioned, the present disclosure should not be limited the shape, the positional relationship or the like unless it is clearly stated that it is essential and/or it is required in principle.

What is claimed is:

1. A valve device comprising:
   a housing that is made of resin and forms a flow passage which is configured to conduct a fluid;
   a boss that is shaped in a tubular form and is injection molded integrally with the housing;
   a ring member that is press-fitted to and is held by an inner peripheral wall of the boss;
   a shaft that is placed on a radially inner side of the ring member and is configured to be rotated about a central axis of the boss, wherein the shaft extends in an axial direction of the central axis in the flow passage;
   a movable valve that is coupled to a portion of the shaft and is configured to be rotated about the central axis in response to rotation of the shaft, wherein the movable valve is configured to adjust a size of a cross-sectional area of a passage opening formed at a portion of the flow passage;
   a plurality of gate marks each of which is a trace of a site of the housing where molten resin is injected at a time of injection molding of the housing, wherein each of the plurality of gate marks is formed at a corresponding location of the housing which is offset from the central axis of the boss; and
   a plurality of ribs that radially inwardly project from the inner peripheral wall of the boss, wherein each of the plurality of ribs is placed at a corresponding location of the boss which is between corresponding circumferentially adjacent two of the plurality of gate marks, wherein:
   the boss has a plurality of reinforced portions, at each of which a corresponding one of the plurality of ribs is placed, and a plurality of unreinforced portions, at each of which none of the plurality of ribs is placed.

2. The valve device according to claim 1, wherein:
   the ring member is a bearing; and
   the shaft is rotatably supported by the bearing.

3. The valve device according to claim 1, wherein the ring member is a seal member.

4. The valve device according to claim 1, wherein:
   each of the plurality of ribs has:
      an inward-facing surface which radially faces an inside of the boss; and
      two curved surfaces which are respectively formed at two circumferentially opposite ends of the inward-facing surface; and
   at each of the plurality of ribs, each of the two curved surfaces is in a form of a curved concave surface that is recessed away from an imaginary surface which is formed by extending the inward-facing surface, wherein the curved concave surface circumferentially enlarges an adjacent one of a plurality of rib-less portions of the boss at each of which none of the plurality of ribs is formed.

5. The valve device according to claim 1, wherein:

the housing has a plurality of fastening portions which are configured to couple the housing to another component of the valve device;

the plurality of fastening portions are located on a radially outer side of the boss and are spaced away from one another in a circumferential direction of the boss; and a number of the plurality of fastening portions is the same as a number of the plurality of gate marks.

6. The valve device according to claim 1, wherein a weld, which is a trace of a site where flows of the molten resin meet each other at the time of injection molding of the housing, is formed at a corresponding location of the housing which includes a corresponding one of the plurality of ribs.

7. The valve device according to claim 1, wherein the resin, which forms the housing, is polyphenylene sulfide.

8. The valve device according to claim 1, wherein a surface of the ring member, which faces in the axial direction, contacts the plurality of ribs.

9. The valve device according to claim 1, wherein:

the housing has a thick-wall portion on a radially outer side of the boss, and the thick-wall portion has an increased wall thickness in comparison to an adjacent portion of the housing placed adjacent to the thick-wall portion; and the plurality of ribs are placed on an opposite side of the ring member which is opposite to the thick-wall portion in the axial direction.

10. A valve device comprising:

a housing that is made of resin and forms a flow passage which is configured to conduct a fluid;

a boss that is shaped in a tubular form and is injection molded integrally with the housing;

a ring member that is press-fitted to and is held by an inner peripheral wall of the boss;

a shaft that is placed on a radially inner side of the ring member and is configured to be rotated about a central axis of the boss, wherein the shaft extends in an axial direction of the central axis in the flow passage;

a movable valve that is coupled to a portion of the shaft and is configured to be rotated about the central axis in response to rotation of the shaft, wherein the movable valve is configured to adjust a size of a cross-sectional area of a passage opening formed at a portion of the flow passage; and a rib that radially inwardly projects from the inner peripheral wall of the boss, wherein the rib is placed at a corresponding location of the boss that includes a weld line which extends along the axial direction, wherein:

the boss has a reinforced portion, at which the rib is placed, and an unreinforced portion, at which the rib is not placed, wherein the reinforced portion and the unreinforced portion are aligned in a circumferential direction of the boss.

11. The valve device according to claim 10, comprising a plurality of gate marks each of which is a trace of a site of the housing where the molten resin is injected at the time of injection molding of the housing, wherein each of the plurality of gate marks is formed at a corresponding location of the housing which is offset from the central axis of the boss, wherein:

the rib is one of a plurality of ribs; and each of the plurality of ribs is placed at a corresponding location of the boss which is between corresponding circumferentially adjacent two of the plurality of gate marks.

\* \* \* \* \*